US012804301B2

(12) United States Patent
Takubo et al.

(10) Patent No.: US 12,804,301 B2
(45) Date of Patent: Nov. 17, 2026

(54) EARPHONE DEVICE

(71) Applicant: Audio-Technica Corporation, Tokyo (JP)

(72) Inventors: Yosuke Takubo, Kanagawa (JP); Masaya Nakako, Tokyo (JP)

(73) Assignee: Audio-Technica Corporation, Tokyo (JP)

( * ) Notice: Subject to any disclaimer, the term of this patent is extended or adjusted under 35 U.S.C. 154(b) by 109 days.

(21) Appl. No.: 18/870,894

(22) PCT Filed: Apr. 25, 2023

(86) PCT No.: PCT/JP2023/016198
§ 371 (c)(1),
(2) Date: Dec. 2, 2024

(87) PCT Pub. No.: WO2023/238535
PCT Pub. Date: Dec. 14, 2023

(65) Prior Publication Data

US 2025/0338055 A1 Oct. 30, 2025

(30) Foreign Application Priority Data

Jun. 7, 2022 (JP) ................................ 2022-092233

(51) Int. Cl.
*H04R 1/1025* (2026.01)
*H04R 1/10* (2006.01)

(52) U.S. Cl.
CPC ......... *H04R 1/1025* (2013.01); *H04R 1/1016* (2013.01); *H04R 1/1041* (2013.01);
(Continued)

(58) Field of Classification Search
CPC ... H04R 1/1025; H04R 1/1016; H04R 1/1041
See application file for complete search history.

(56) References Cited

U.S. PATENT DOCUMENTS

| | | | |
|---|---|---|---|
| 10,419,838 | B1 | 9/2019 | Criswell |
| 2015/0195639 | A1 | 7/2015 | Azmi |

(Continued)

FOREIGN PATENT DOCUMENTS

| | | | |
|---|---|---|---|
| JP | 2017-099259 A | 6/2017 | |
| JP | 2020-150346 A | 9/2020 | |
| WO | 2020/017128 A1 | 1/2020 | |

OTHER PUBLICATIONS

European Application 23819522.6 Extended Search Report Mailed May 13, 2026.

*Primary Examiner* — Olisa Anwah
(74) *Attorney, Agent, or Firm* — WCF IP

(57) ABSTRACT

Provided is an earphone device capable of solving issues arising from the left and right sound emitting units being physically separated. The earphone device 1 includes a first sound emitting unit to be worn on one ear of a user and a second sound emitting unit be worn on the other. The first sound emitting unit includes a first antenna 141, a first driver unit 13, a first storage battery 16, and a first magnet for attachment to the second sound emitting unit. The second sound emitting unit includes a second antenna 241, a second driver unit 23, a second storage battery 26, and a second magnet for attachment to the first sound emitting unit. The first sound emitting unit is physically separable from the second sound emitting unit and the first and second sound emitting units are magnetically attached to each other by the first and second magnets.

21 Claims, 13 Drawing Sheets

(52) U.S. Cl.
CPC ...... *H04R 2420/07* (2013.01); *H04R 2460/03* (2013.01); *H04R 2460/17* (2013.01)

(56) References Cited

U.S. PATENT DOCUMENTS

| | | | | |
|---|---|---|---|---|
| 2017/0094392 | A1 | 3/2017 | Zörkendörfer et al. | |
| 2017/0155992 | A1* | 6/2017 | Perianu ................ | H04R 29/001 |
| 2018/0109867 | A1 | 4/2018 | Hirsch | |
| 2020/0021904 | A1 | 1/2020 | McCarthy | |
| 2021/0289282 | A1 | 9/2021 | Onizuka et al. | |

* cited by examiner

EARPHONE DEVICE

TECHNICAL FIELD

The present invention relates to an earphone device.

BACKGROUND ART

Fully wireless earphones having two completely separated left and right sound emitting units have become widespread in recent years. Each sound emitting unit outputs sound waves, based on audio signals received from a musical sound player via wireless communication.

Each sound emitting unit includes an antenna that receives audio signals, a driver unit that converts the audio signals into sound waves and outputs the sound waves, a storage battery that supplies power to the antenna, the driver unit, and the like, and a casing (a housing) that accommodates the antenna, the driver unit, and the storage battery. The storage battery is charged when the sound emitting unit is connected to a charger.

Fully wireless earphone chargers are provided as charging cases capable of accommodating each sound emitting unit, for example. Each sound emitting unit is accommodated in the charging case separately, i.e., in a state in which the left sound emitting unit and the right sound emitting unit are physically separated, and charged. In this state, each sound emitting unit is accommodated inside the charging case in a state in which a portion of the casing of each sound emitting unit is protruded in the charging case in such a manner that a user can pinch that portion of the casing with fingers (for example, see PTL1).

CITATION LIST

Patent Literature

[PTL 1] JP 2017-99259 A

When the sound emitting unit is taken out of the charging case, each sound emitting unit is separately taken out of the charging case. At this moment, the protruding portion of the casing is pinched with user's fingers. Each sound emitting unit is placed in the auricle for use. For this reason, the size of the casing is limited to the size to fit the auricle. Accordingly, the amount of the protrusion of the casing inside the charging case tends to be small, and the casing is often designed to be rounded. Thus, each sound emitting unit is difficult to take out of the charging case and may slip from the fingers when taken out. Dropping the sound emitting unit may cause not only a failure of the sound emitting unit but also a traffic disturbance such as interruption of the movement of a moving body (persons, bicycles, automobiles, trains, and the like) by a user who intends to pick up the dropped sound emitting unit, which may also lead to a serious accident such as the user coming into contact with the moving body.

In addition, each sound emitting unit is accommodated in the charging case and carried. Some users, however, do not carry the charging case when the sound emitting units are in use. In such a case, when the user finishes using the sound emitting units, the sound emitting units are accommodated in the user's bag or a pocket of the user's clothing and carried. When being carried, the sound emitting units are separated in the bag or the pocket.

Furthermore, in general, the power of the sound emitting unit is turned on when the sound emitting unit is taken out of the charging case. In contrast, the power of the sound emitting unit is turned off when the sound emitting unit is accommodated in the charging case. In this manner, the turn-on/off of the power supply is controlled by putting the sound emitting unit in and out of the charging case. Thus, the sound emitting units of some fully wireless earphones do not include a physical button for a user to control the turn-on/off of the power supply. In such fully wireless earphones, when a user who does not carry the charging case finishes using the sound emitting units, the power supply is not controlled to turn off, and the sound emitting units continue to discharge. As a result, the charging amount of the sound emitting units continue to decrease.

As described above, the two sound emitting units of the fully wireless earphone are charged, taken out of the charging case, and carried in a physically separated state.

However, the user's act of taking out each sound emitting unit separately from the charging case may also be a burden on the user. In addition, the user's act of carrying each sound emitting unit apart from the other may lead to loss of the sound emitting unit. As described above, handling the physically separated left and right sound emitting units is an issue.

SUMMARY OF INVENTION

Technical Problem

The present invention is directed to providing an earphone device capable of solving issues that may occur due to left and right sound emitting units being physically separated.

Solution to Problem

An earphone device according to one aspect of the present invention includes a first sound emitting unit to be worn on one ear of a user, and a second sound emitting unit be worn on another ear of the user, in which the first sound emitting unit includes a first antenna, a first driver unit that drives based on a first audio signal received by the first antenna, a first storage battery that supplies power to the first antenna, and a first magnet to be used for attaching the first sound emitting unit to the second sound emitting unit, the second sound emitting unit includes a second antenna, a second driver unit that drives based on a second audio signal received by the second antenna, a second storage battery that supplies power to the second antenna, and a second magnet to be used for attaching the second sound emitting unit to the first sound emitting unit, the first sound emitting unit is physically separable from the second sound unit, and the first sound emitting unit is connected to the second sound emitting unit by magnetic forces of the first magnet and the second magnet.

Advantageous Effects of Invention

The present invention is able to solve the issues that may occur due to the left and right sound emitting units being physically separated.

DESCRIPTION OF EMBODIMENTS

Embodiments of a wireless earphone system including an earphone device according to the present invention (hereinafter referred to as "present device") will be described below with reference to the drawings.

Wireless Earphone System

Configuration of Wireless Earphone System

Figure 1:
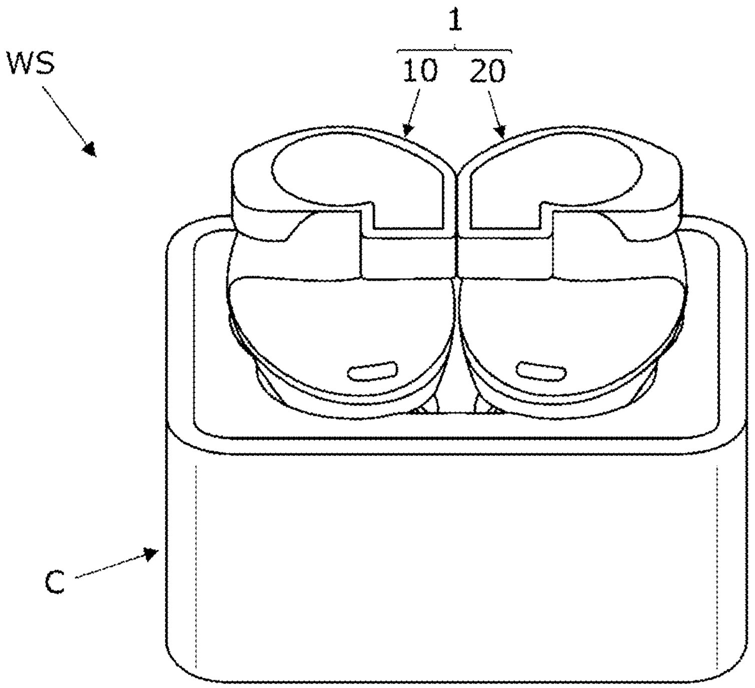
FIG. 1 is an appearance view of a wireless earphone system including an earphone device and an earphone device charger according to one or more embodiments of the present invention.

FIG. 1 is an appearance view of the wireless earphone system including the present device and an earphone device charger.

The figure illustrates a state in which the earphone device is accommodated in the earphone device charger.

The wireless earphone system WS includes the present device 1 and the earphone device charger (hereinafter referred to as "charger") C. The present device 1 includes a first sound emitting unit 10 and a second sound emitting unit 20. In the wireless earphone system WS, the present device 1 (the first sound emitting unit 10, the second sound emitting unit 20) is accommodated in the charger C, and thus the charger C charges the present device 1. When the present device 1 (the first sound emitting unit 10, the second sound emitting unit 20) is accommodated in the charger C, a portion of the present device 1 protrudes from the charger C. That is, the portion of the present device 1 is not accommodated in the charger C.

Earphone Device

Next, the present device 1 will be described.

Configuration of Earphone Device

Figure 2:
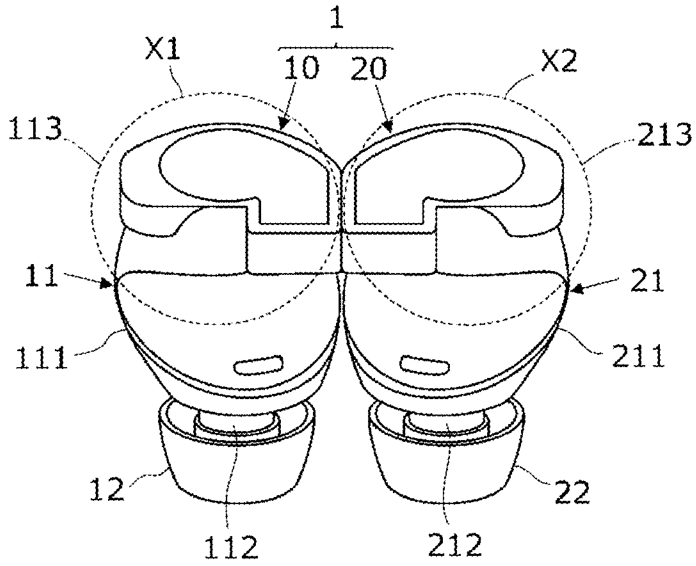
FIG. 2 is an appearance view of the earphone device illustrating an embodiment of the earphone device in FIG. 1.
Figure 3:
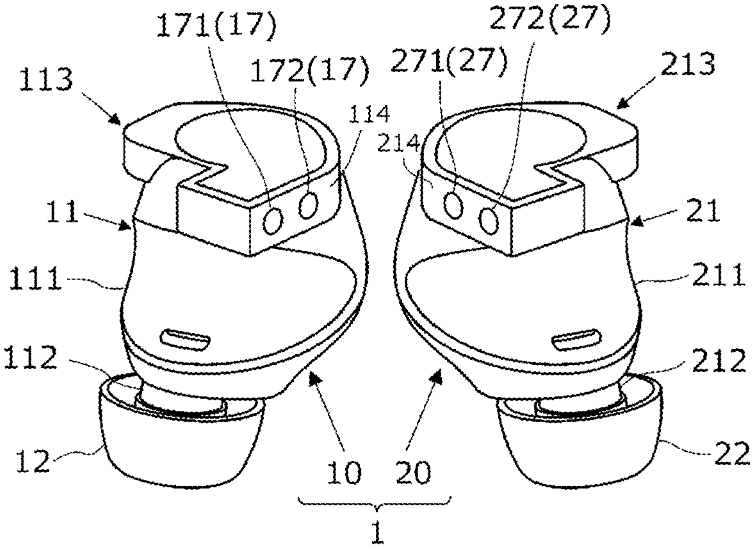
FIG. 3 is another appearance view of the earphone device illustrating the embodiment of the earphone device in FIG. 1.
Figure 4:
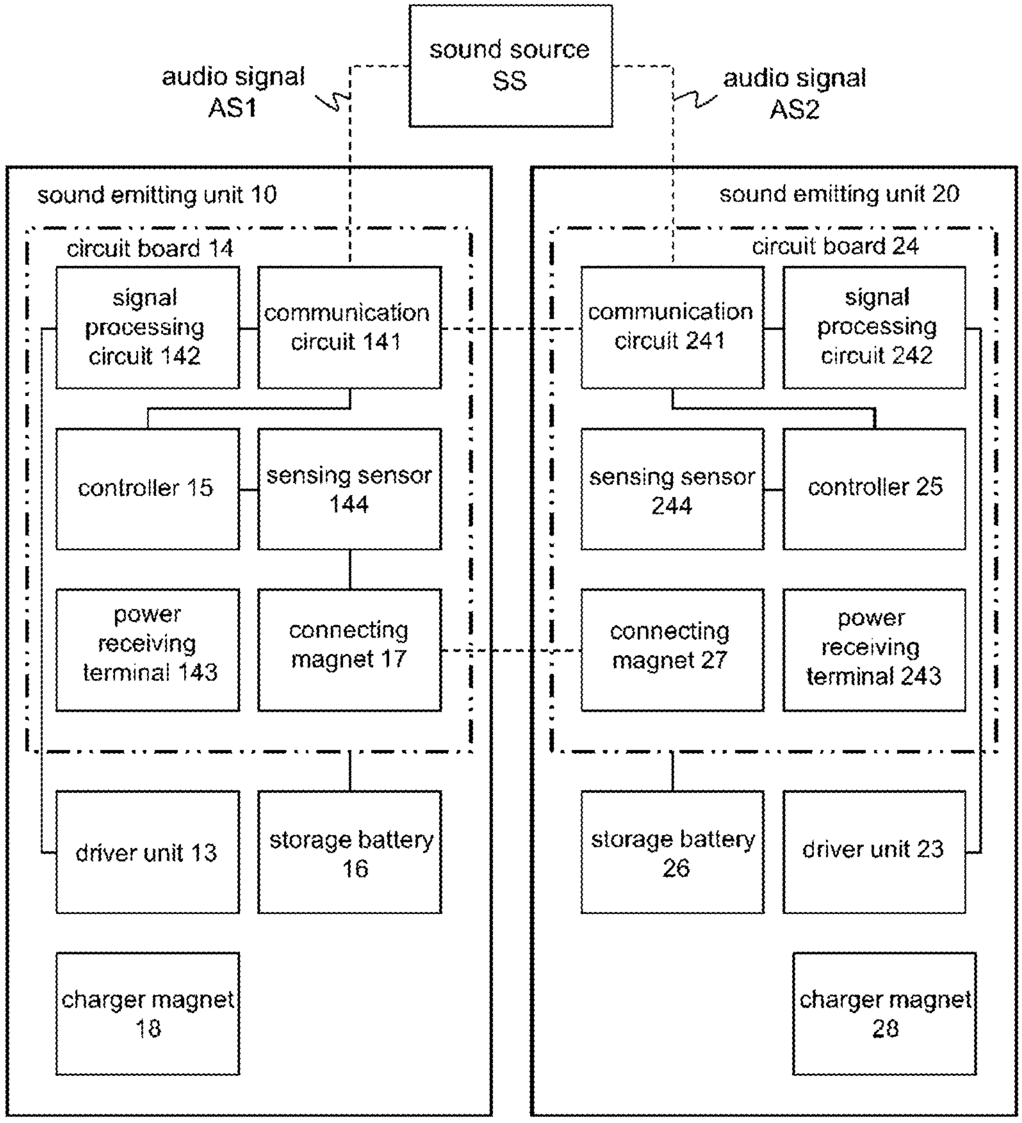
FIG. 4 is a functional block diagram of the earphone device in FIG. 1.

FIG. 2 is an appearance view of the present device 1 illustrating an embodiment of the present device 1. FIG. 3 is another appearance view of the present device 1 illustrating the embodiment of the present device 1. The figure illustrates a state in which the first sound emitting unit 10 and the second sound emitting unit 20 are separated from each other. FIG. 4 is a functional block diagram of the present device 1.

The present device 1 is worn on a user's ear of the present device 1 and outputs sound waves corresponding to audio signals (audio signal AS1, audio signal AS2) from a sound source SS such as a musical sound player. The present device 1 receives the audio signals from the sound source SS via a wireless communication line such as Bluetooth (registered trademark), for example.

The present device 1 is what is called a fully wireless earphone in which the sound emitting unit 10 and the sound emitting unit 20 are not physically connected to each other with a cable or the like (the sound emitting unit 10 and the sound emitting unit 20 are completely separated from each other). That is, the sound emitting unit 10 is physically separable from the sound emitting unit 20. The sound emitting unit 10 is an example of the first sound emitting unit in the present invention, and the sound emitting unit 20 is an example of the second sound emitting unit in the present invention.

The sound emitting unit 10 is worn on one ear (e.g., the left ear) of the user and outputs the sound wave corresponding to the audio signal AS1 from the sound source SS. That is, the sound emitting unit 10 is the left sound emitting unit, for example. The sound emitting unit 10 includes a housing 11, an earpiece 12, a driver unit 13, a circuit board 14, a controller 15, a storage battery 16, a connecting magnet 17, and a charger magnet 18. The audio signal AS1, the housing 11, the earpiece 12, the driver unit 13, the circuit board 14, the controller 15, the storage battery 16, the connecting magnet 17, and the charger magnet 18 are examples of a first audio signal, a first housing, a first earpiece, a first driver unit, a first circuit board, a first controller, a first storage battery, a first connecting magnet, and a first charger magnet in the present invention, respectively.

The housing 11 accommodates the driver unit 13, the circuit board 14, the controller 15, the storage battery 16, the connecting magnet 17, and the charger magnet 18. The housing 11 is made of synthetic resin such as ABS, for example. The housing 11 has a shape to fit the contours of an auricle. The housing 11 includes a main body 111, a sound conduit 112, a grip portion 113, and a connecting surface 114. The main body 111 and the sound conduit 112 are integrally formed, and an internal space of the main body 111 communicates with an internal space of the sound conduit 112. The main body 111, the sound conduit 112, the grip portion 113, and the connecting surface 114 are examples of a first main body, a first sound conduit, a first grip portion, and a first connecting surface in the present invention, respectively.

The main body 111 accommodates the driver unit 13, the circuit board 14, the controller 15, the storage battery 16, the connecting magnet 17, and the charger magnet 18.

The sound conduit 112 guides a sound wave from the driver unit 13 to the user's ear canal in a state in which the sound emitting unit 10 is worn on the auricle (ear) of the user (hereinafter referred to as a "worn state"). The sound conduit 112 is arranged at an end of the housing 11 (an end portion of the housing 11 in the downward direction of the page in FIG. 2).

Note that, in the present invention, the main body of the first sound emitting unit 10 and the sound conduit of the first sound emitting unit 10 are integrally formed, but the main body and the sound conduit may be formed separately.

The grip portion 113 is a portion of the main body 111 that is gripped (pinched) by the user when the sound emitting unit 10 (the present device 1) is taken out of the charger C. The grip portion 113 is a portion of the main body 111 (the housing 11) that protrudes from the charger C when the main body 111 is accommodated in the charger C. The grip portion 113 is a portion that is easily gripped by the user of the present device 1 when the sound emitting unit 10 is taken out of the charger C, and the grip portion 113 is a part ("X1") surrounded by the dashed line in FIG. 2.

Note that the grip portion of the first sound emitting unit is not limited to the part surrounded by the dashed line in FIG. 2.

The connecting surface 114 is a surface in contact with the sound emitting unit 20 when the sound emitting unit 10 is connected to the sound emitting unit 20 via the connecting magnet 17. The connecting surface 114 is a portion of the main body 111.

The earpiece 12 comes into close contact with the inner wall of the ear canal of the user in the worn state. The earpiece 12 is attached to an outer peripheral surface of the sound conduit 112. The earpiece 12 is an elastic material such as silicone rubber, for example.

The driver unit 13 is driven based on the audio signal AS1 from the sound source SS received by a communication circuit 141 described later and outputs the sound wave corresponding to the audio signal AS1. The driver unit 13 is a dynamic electroacoustic transducer, for example. The driver unit 13 is accommodated in the main body 111 (the housing 11).

The circuit board 14 is a board on which an electronic circuit, a terminal, and the like described later are attached and mounted. The circuit board 14 is accommodated in the main body 111 (the housing 11). The circuit board 14 is a printed circuit board (PCB), for example.

The circuit board 14 includes the communication circuit 141, a signal processing circuit 142, a power receiving terminal 143, and a sensing sensor 144. The communication circuit 141 and the signal processing circuit 142 are examples of the electronic circuits described above. The power receiving terminal 143 is an example of the terminal described above. The communication circuit 141, the signal processing circuit 142, the power receiving terminal 143, and the sensing sensor 144 are examples of a first communication circuit (a first antenna), a first signal processing circuit, a first power receiving terminal, and a first sensing sensor in the present invention, respectively.

The communication circuit 141 receives the audio signal AS1 from the sound source SS via a wireless communication line. The communication circuit 141 is a communication interface that exchanges the audio signal AS1 with the sound source SS. The communication circuit 141 is mounted on the circuit board 14. The audio signal AS1 to be received by the communication circuit 141 is a digital signal. The communication circuit 141 has a function of transmitting and receiving signals and data to and from a communication circuit 241 described later. The communication circuit (the first communication circuit) 141 is an example of the first antenna in the present invention.

The signal processing circuit 142 executes predetermined signal processing for the audio signal AS1 received by the communication circuit 141 and transmits the processed signal to the driver unit 13. The signal processing circuit 142 is mounted on the circuit board 14. The signal processing circuit 142 is a D/A conversion circuit, for example. The signal to be transmitted from the signal processing circuit 142 to the driver unit 13 is an analog signal.

The power receiving terminal 143 receives, from the charger C, power to be charged in the storage battery 16. The power receiving terminal 143 is mounted on the circuit board 14. A portion of the power receiving terminal 143 in contact with a first power feeding terminal 34 described later is exposed to the outside of the main body 111 (the housing 11). The power receiving terminal 143 is a contact terminal, for example. The "contact terminal" is a terminal that is electrically connected to (i.e., conducts to) the first power feeding terminal 34 by contacting the first power feeding terminal 34.

The sensing sensor 144 senses a magnetic field to be generated by a connecting magnet 27 described later through sensing processing and transmits the sensed information (the sensed signal) to the connecting magnet 17. The sensing sensor 144 is mounted on the circuit board 14. The sensing sensor 144 is a Hall element, for example. An example of processing of the "sensing processing" will be described later.

Figure 5:
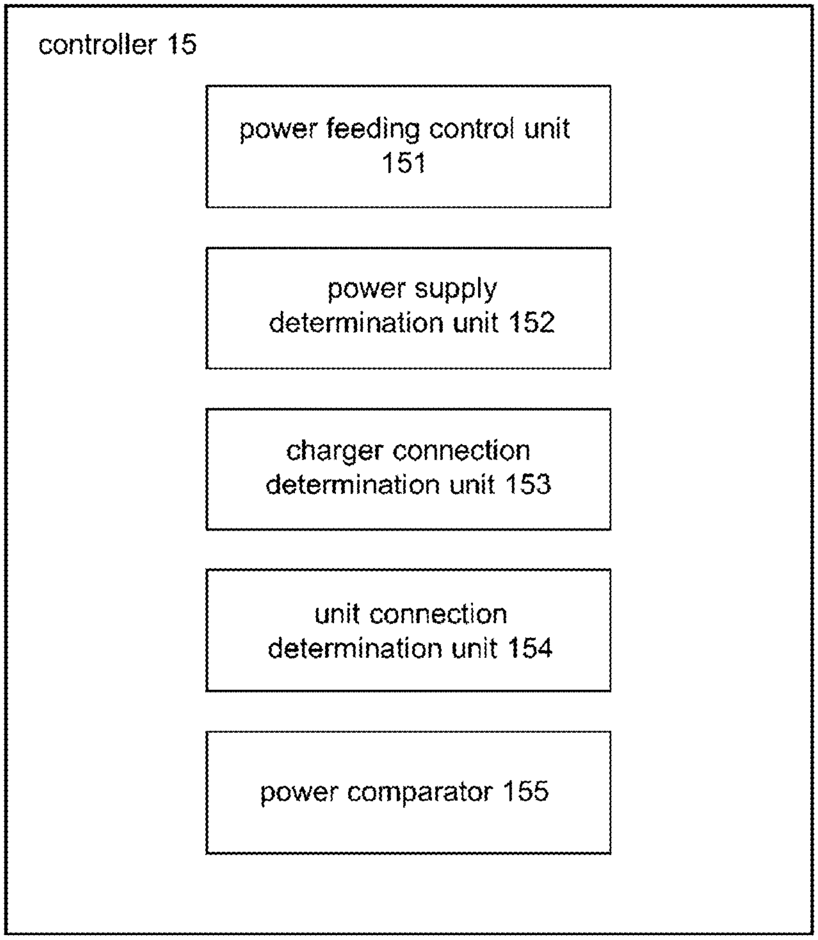
FIG. 5 is a functional block diagram of a first controller included in a first sound emitting unit included in the earphone device in FIG. 1.

FIG. 5 is a functional block diagram of the controller 15. In the following description of the controller 15, FIG. 4 will be also referred to as appropriate.

The controller 15 controls the overall operation of the sound emitting unit 10. The controller 15 includes a central processing unit (CPU), a random access memory (RAM) that functions as a working area for the CPU, and a read only memory (ROM) that stores various kinds of information such as various kinds of programs, for example. The controller 15 is mounted on the circuit board 14 and accommodated in the housing 11. The controller 15 includes a power feeding control unit 151, a power supply determination unit 152, a charger connection determination unit 153, a unit connection determination unit 154, and a power comparator 155. The power feeding control unit 151, the power supply determination unit 152, the charger connection determination unit 153, the unit connection determination unit 154, and the power comparator 155 are examples of a first power feeding control unit, a first power supply determination unit, a first charger connection determination unit, a first unit connection determination unit, and a first power comparator in the present invention, respectively.

The power feeding control unit 151 controls the turn-on (start and maintenance) and turn-off (stop) of power feeding (hereinafter referred to as "first power feeding") from the storage battery 16 to the electronic circuit such as the communication circuit 141.

The power supply determination unit 152 determines whether the sound emitting unit 10 is turned on or turned off. The "power supply is turned on" means that the first power feeding is being performed. The "power supply is turned off" means that the first power feeding is stopped. In this embodiment, even though the power supply is turned off, the power supply is being supplied to the controller 15. That is, the controller 15 functions at all times.

The charger connection determination unit 153 determines whether the sound emitting unit 10 is connected to the charger C.

The unit connection determination unit 154 determines whether the sound emitting unit 10 is connected to the sound emitting unit 20.

The power comparator 155 compares the magnitude of the amount of power stored in the storage battery 16 (hereinafter referred to as "first power") with the amount of power stored in a storage battery 26 (hereinafter referred to as "second power").

The specific operations of the power feeding control unit 151, the power supply determination unit 152, the charger connection determination unit 153, the unit connection determination unit 154, and the power comparator 155 are described later.

Referring now back to FIGS. 2 to 4, the storage battery 16 receives and stores the power from the charger C via the power receiving terminal 143, and supplies (feeds) the power necessary for the electronic circuits attached to the circuit board 14 such as the communication circuit 141 to the electronic circuits. That is, the storage battery 16 receives the power to be fed to the electronic circuits from the charger C via the power receiving terminal 143 and feeds the power to the electronic circuits. The storage battery 16 supplies (feeds) the power to the communication circuit 141, the signal processing circuit 142, and the controller 15 via the circuit board 14. The storage battery 16 is accommodated in the housing 11. The storage battery 16 is a button-type small rechargeable battery, for example.

The connecting magnet 17 is a magnet to be used for interconnecting the sound emitting unit 10 and the sound emitting unit 20. The connecting magnet 17 is attached to the connecting magnet 27 described later by a magnetic force (i.e., magnetically attached), thereby connecting the sound emitting unit 10 to sound emitting unit 20. The connecting magnet 17 has conductivity and also functions as an electrical terminal. That is, when the sound emitting unit 10 is connected to the sound emitting unit 20 by the magnetic forces of the connecting magnets 17 and 27, the connecting magnet 17 is electrically connected to the connecting magnet 27. The connecting magnet 17 is mounted on the circuit board 14 and accommodated in a portion of the main body 111 (the housing 11). The connecting magnet 17 is arranged at a portion (the grip portion 113) of the main body 111 (the housing 11) protruding from the charger C when the main body 111 is accommodated in the charger C. The connecting magnet (the first connecting magnet) 17 is an example of a first magnet in the present invention and is an example of a first terminal in the present invention.

The connecting magnet 17 is arranged in such a manner that, when the main body 111 (the housing 11) is accommodated in the charger C, a portion to be connected to the connecting magnet 27 of the protrusion from the charger C (i.e., the grip portion 113) is exposed from the connecting surface 114. That is, the portion of the connecting magnet 17 is exposed from the connecting surface 114.

The force for connecting the sound emitting unit 10 to the sound emitting unit 20 by the magnetic forces of the connecting magnet 17 and the connecting magnet 27, i.e., the magnitude (the magnetic attraction) of the magnetic force between the connecting magnet 17 and the connecting magnet 27 is approximately 1.7 N to 1.9 N, for example.

The connecting magnet 17 functioning as an electrical terminal includes a north pole magnet 171 and a south pole magnet 172. The north pole side of the north pole magnet 171 is exposed from the connecting surface 114 (the housing 11), and the south pole side of the south pole magnet 172 is exposed from the connecting surface 114 (the housing 11). In this case, the north pole magnet 171 functions as a first north pole terminal in the present invention, and the south pole magnet 172 functions as a first south pole terminal in the present invention.

When the sound emitting unit 10 is accommodated in the charger C, the charger magnet 18 is connected to a first earphone magnet 32 described later (see FIG. 7) by magnetic forces, thereby connecting the sound emitting unit 10 to the charger C. The charger magnet 18 positions the sound emitting unit 10 with respect to the charger C when the sound emitting unit 10 is connected to the charger C. A portion of the charger magnet 18 is exposed to the outside of the main body 111 (the housing 11). The force for connecting the sound emitting unit 10 to the charger C by the magnetic forces of the charger magnet 18 and the first earphone magnet 32, i.e., the magnitude (the magnetic attraction) of the magnetic force (herein after referred to as first magnetic force) between the charger magnet 18 and the first earphone magnet 32 is approximately 0.6 N to 0.7 N, for example. That is, the magnitude (the magnetic attraction) of the first magnetic force is smaller than the magnitude (magnetic attraction) of the magnetic force between the connecting magnet 17 and the connecting magnet 27.

The sound emitting unit 20 is worn on the other ear (e.g., the right ear) of the user and outputs a sound wave corresponding to an audio signal AS2 from the sound source SS. That is, the sound emitting unit 20 is the right sound emitting unit, for example. The shape of the sound emitting unit 20 has a mirror-image relationship with the shape of the sound emitting unit 10 with the connecting surface 114 and a connecting surface 214 described later serving as planes of symmetry. The sound emitting unit 20 includes a housing 21, an earpiece 22, a driver unit 23, a circuit board 24, a controller 25, the storage battery 26, the connecting magnet 27, and a charger magnet 28. The configuration and function of the sound emitting unit 20 are substantially common to the configuration and function of the sound emitting unit 10, except that the audio signal received from the sound source SS is the audio signal AS2. Thus, a description of the configuration of the sound emitting unit 20 will be partially omitted. The audio signal AS2, the housing 21, the earpiece 22, the driver unit 23, the circuit board 24, the controller 25, the storage battery 26, the connecting magnet 27, and the charger magnet 28 are examples of a second audio signal, a second housing, a second earpiece, a second driver unit, a second circuit board controller, a second storage battery, a second connecting magnet, and a second charger magnet in the present invention, respectively.

The housing 21 accommodates the driver unit 23, the circuit board 24, the controller 25, the storage battery 26, the connecting magnet 27, and the charger magnet 28. The housing 21 includes a main body 211, a sound conduit 212, a grip portion 213, and the connecting surface 214. The main body 211 and the sound conduit 212 are integrally formed, and an internal space of the main body 211 communicates with an internal space of the sound conduit 212. When the sound emitting unit 10 is connected to the sound emitting unit 20, the shape of the housing 21 has a mirror-image relationship with the housing 11 with the connecting surface 214 serving as a plane of symmetry. The main body 211, the sound conduit 212, the gripping portion 213, and the connecting surface 214 are examples of a second main body, a second sound conduit, a second grip portion, and a second connecting surface in the present invention, respectively.

In the present invention, “the mirror-image relationship” includes not only cases where two elements (e.g., the sound emitting unit 10 and the sound emitting unit 20) are in a geometrically exact mirror-image relationship, but also cases where part of these two elements is not a geometrically exact mirror image. That is, the mirror-image relationship includes cases where the two elements are not in a complete mirror-image relationship. That is, the mirror-image relationship includes cases where the two elements are in a substantially mirror-image relationship as a whole.

The sound conduit 212 is arranged at the end of the housing 21 (the end portion of the housing 21 in the downward direction of the page in FIG. 2).

Note that, in the present invention, the main body of the second sound emitting unit and the sound conduit of the second sound emitting unit are integrally formed, but the main body and the sound conduit may be formed separately.

The grip portion 213 is a portion of the main body 211 that is gripped (pinched) by the user when the sound emitting unit 20 (the present device 1) is taken out of the charger C. The grip portion 213 is a portion of the main body 211 (the housing 21) that protrudes from the charger C when the main body 211 is accommodated in the charger C. The grip portion 213 is a portion that is easily gripped by the user of the present device 1 when the sound emitting unit 20 is taken out of the charger C, and the grip portion 213 is a part "X2" surrounded by the dashed line in FIG. 2.

Note that the grip portion of the second sound emitting unit is not limited to the part surrounded by the dashed line in FIG. 2.

The connecting surface 214 is a surface in contact with the sound emitting unit 10 when the sound emitting unit 10 is connected to the sound emitting unit 20 via the connecting magnet 17. That is, the connecting surface 214 is connected to the connecting surface 114 when the sound emitting unit 10 and the sound emitting unit 20 are interconnected. The connecting surface 214 is a portion of the main body 111.

The earpiece 22 is attached to an outer peripheral surface of the sound conduit 212.

The driver unit 23 is driven based on the audio signal AS2 from the sound source SS received by the communication circuit 241 described later and outputs the sound wave corresponding to the audio signal AS2. The driver unit 23 is a dynamic electroacoustic transducer, for example. The driver unit 23 is accommodated in the main body 211 (the housing 21).

The circuit board 24 is accommodated in the main body 211 (the housing 21). The circuit board 24 is a PCB, for example.

The circuit board 24 includes the communication circuit 241, a signal processing circuit 242, a power receiving terminal 243, and a sensing sensor 244. The communication circuit 241 and the signal processing circuit 242 are examples of the electronic circuits described above. The power receiving terminal 243 is an example of the terminal described above. The communication circuit 241, the signal processing circuit 242, the power receiving terminal 243, and the sensing sensor 244 are examples of a second communication circuit (a second antenna), a second signal processing circuit, a second power receiving terminal, and a second sensing sensor in the present invention, respectively.

The communication circuit 241 receives the audio signal AS2 from the sound source SS via a wireless communication line. The communication circuit 241 is a communication interface that exchanges the audio signal AS2 with the sound source SS. The communication circuit 241 is mounted on the circuit board 24. The audio signal AS2 to be received by the communication circuit 241 is a digital signal. The communication circuit 241 has a function of transmitting and receiving signals and data to and from the communication circuit 141. The communication circuit (the second communication circuit) 241 is an example of the second antenna in the present invention.

The signal processing circuit 242 executes predetermined signal processing for the audio signal AS2 received by the communication circuit 241 and transmits the processed signal to the driver unit 23. The signal processing circuit 242 is mounted on the circuit board 24. The signal processing circuit 242 is a D/A conversion circuit, for example. The signal to be transmitted from the signal processing circuit 242 to the driver unit 23 is an analog signal.

The power receiving terminal 243 is mounted on the circuit board 24. A portion of the power receiving terminal 243 in contact with a second power feeding terminal 35 described later is exposed to the outside of the main body 211 (the housing 21). The power receiving terminal 243 is a contact terminal, for example.

The sensing sensor 244 senses a magnetic field to be generated by the connecting magnet 17 through sensing processing and transmits the sensed information (the sensed signal) to the connecting magnet 27. The sensing sensor 244 is mounted on the circuit board 24. The sensing sensor 244 is a Hall element, for example.

The controller 25 controls the overall operation of the sound emitting unit 20. The controller 25 includes a CPU, a RAM, and a ROM, for example. The controller 25 is mounted on the circuit board 24 and accommodated in the housing 21. The controller 25 includes a second power feeding control unit (not illustrated), a second power supply determination unit (not illustrated), a second charger connection determination unit (not illustrated), a second unit connection determination unit (not illustrated), and a second power comparator (not illustrated).

The configuration, function, and operation of the second power feeding control unit, the second power supply determination unit, the second charger connection determination unit, the second unit connection determination unit, and the second power comparator are common to the configuration, function, and operation of the power feeding control unit 151, the power supply determination unit 152, the charger connection determination unit 153, the unit connection determination unit 154, and the power comparator 155 included in the controller 15. Thus, a specific description of the second power feeding control unit, the second power supply determination unit, the second charger connection determination unit, the second unit connection determination unit, and the second power comparator will be omitted.

The storage battery 26 receives and stores power from the charger C via the power receiving terminal 243, and supplies (feeds) power necessary for the electronic circuits attached to the circuit board 24 such as the communication circuit 241 to the electronic circuits. That is, the storage battery 26 receives the power to be fed to the electronic circuits from the charger C via the power receiving terminal 243 and feeds the power to the electronic circuits. The storage battery 26 supplies (feeds) the power from the power receiving terminal 243 to the communication circuit 241, the signal processing circuit 242, and the controller 25 via the circuit board 24. The storage battery 26 is accommodated in the housing 21.

The connecting magnet 27 is a magnet to be used for interconnecting the sound emitting unit 10 and the sound emitting unit 20. The connecting magnet 27 is attached to the connecting magnet 17 by a magnetic force (i.e., magnetically attached), thereby connecting the sound emitting unit 20 to sound emitting unit 10. The connecting magnet 27 has conductivity and also functions as an electrical terminal. That is, when the sound emitting unit 10 is connected to the sound emitting unit 20 by the magnetic force of the connecting magnets 17 and 27, the connecting magnet 27 is electrically connected to the connecting magnet 17. The connecting magnet 27 is mounted on the circuit board 24 and accommodated in a portion of the main body 211 (the housing 21). The connecting magnet 27 is arranged at a portion (a grip portion 213) of the main body 211 (the housing 21) protruding from the charger C when the main body 211 is accommodated in the charger C. The connecting magnet (the second connecting magnet) 27 is an example of a second magnet in the present invention and is an example of a second terminal in the present invention.

The connecting magnet 27 is arranged in such a manner that, when the main body 211 (the housing 21) is accommodated in the charger C, a portion to be connected to the connecting magnet 17 of the protrusion from the charger C (i.e., the grip portion 213) is exposed from the connecting surface 214. That is, the portion of the connecting magnet 27 is exposed from the connecting surface 214. The connecting magnet 27 is also arranged in such a manner as to oppose the connecting magnet 17 when the sound emitting unit 10 and the sound emitting unit 20 are interconnected.

As described above, the shape of the sound emitting unit 20 has a mirror-image relationship with the shape of the sound emitting unit 10 with the connecting surface 114 and the connecting surface 214 serving as planes of symmetry. Thus, when the sound emitting unit 10 is connected to the sound emitting unit 20, the size of the present device 1 becomes compact.

The force for connecting the sound emitting unit 20 to the sound emitting unit 10 by the magnetic forces of the connecting magnet 27 and the connecting magnet 17, i.e., the magnitude (the magnetic attraction) of the magnetic force between the connecting magnet 17 and the connecting magnet 27 is approximately 1.7 N to 1.9 N, for example, as described above.

The connecting magnet 27 functioning as an electrical terminal includes a north pole magnet 271 and a south pole magnet 272. The north pole side of the north pole magnet 271 is exposed from the connecting surface 214 (the housing 21), and the south pole side of the south pole magnet 272 is exposed from the connecting surface 214 (the housing 21). In this case, the north pole magnet 271 functions as a second north pole terminal in the present invention, and the south pole magnet 272 functions as a second south pole terminal in the present invention.

The north pole magnet 271 is arranged at a position of the connecting surface 214 opposing the south pole magnet 172 when the sound emitting unit 10 and the sound emitting unit 20 are interconnected. The south pole magnet 272 is arranged at a position of the connecting surface 214 opposing the north pole magnet 171 when the sound emitting unit 10 and the sound emitting unit 20 are interconnected. That is, when the sound emitting unit 10 and the sound emitting unit 20 are interconnected, the north pole magnet 271 is attached to the south pole magnet 172 by magnetic forces (i.e., magnetically attached), and the south pole magnet 272 is attached to the north pole magnet 171 by magnetic forces (i.e., magnetically attached). That is, the sound emitting unit 20 is connected to the sound emitting unit 10 by the magnetic forces of the north pole magnet 271 and the south pole magnet 172 and by the magnetic forces of the south pole magnet 272 and the north pole magnet 171.

When the sound emitting unit 20 is accommodated in the charger C, the charger magnet 28 is connected to a second earphone magnet 33 described later (see FIG. 7) by magnetic forces, thereby connecting the sound emitting unit 20 to the charger C. The charger magnet 28 positions the sound emitting unit 20 with respect to the charger C when the sound emitting unit 20 is connected to the charger C. A portion of the charger magnet 28 is exposed to the outside of the main body 211 (the housing 21). The force for connecting the sound emitting unit 20 to the charger C by the magnetic forces of the charger magnet 28 and the second earphone magnet 33, i.e., the magnitude (the magnetic attraction) of the magnetic force (herein after referred to as second magnetic force) between the charger magnet 28 and the second earphone magnet 33 is 0.6 N to 0.7 N, for example. That is, the magnitude (the magnetic attraction) of the second magnetic force is smaller than the magnitude (the magnetic attraction) of the magnetic force between the connecting magnet 17 and the connecting magnet 27.

Earphone Device Charger

Configuration of Earphone Device Charger

Figure 6:
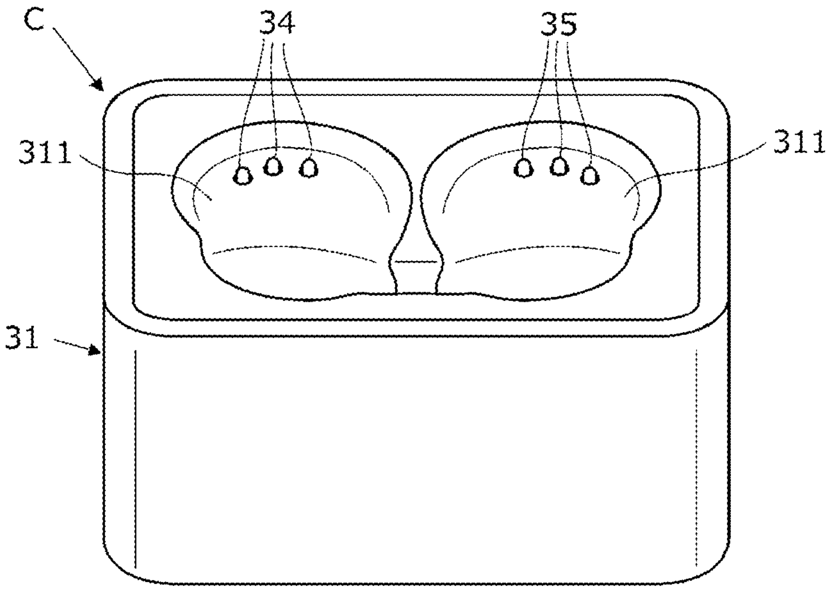
FIG. 6 is an appearance view of the earphone device charger in FIG. 1.
Figure 7:
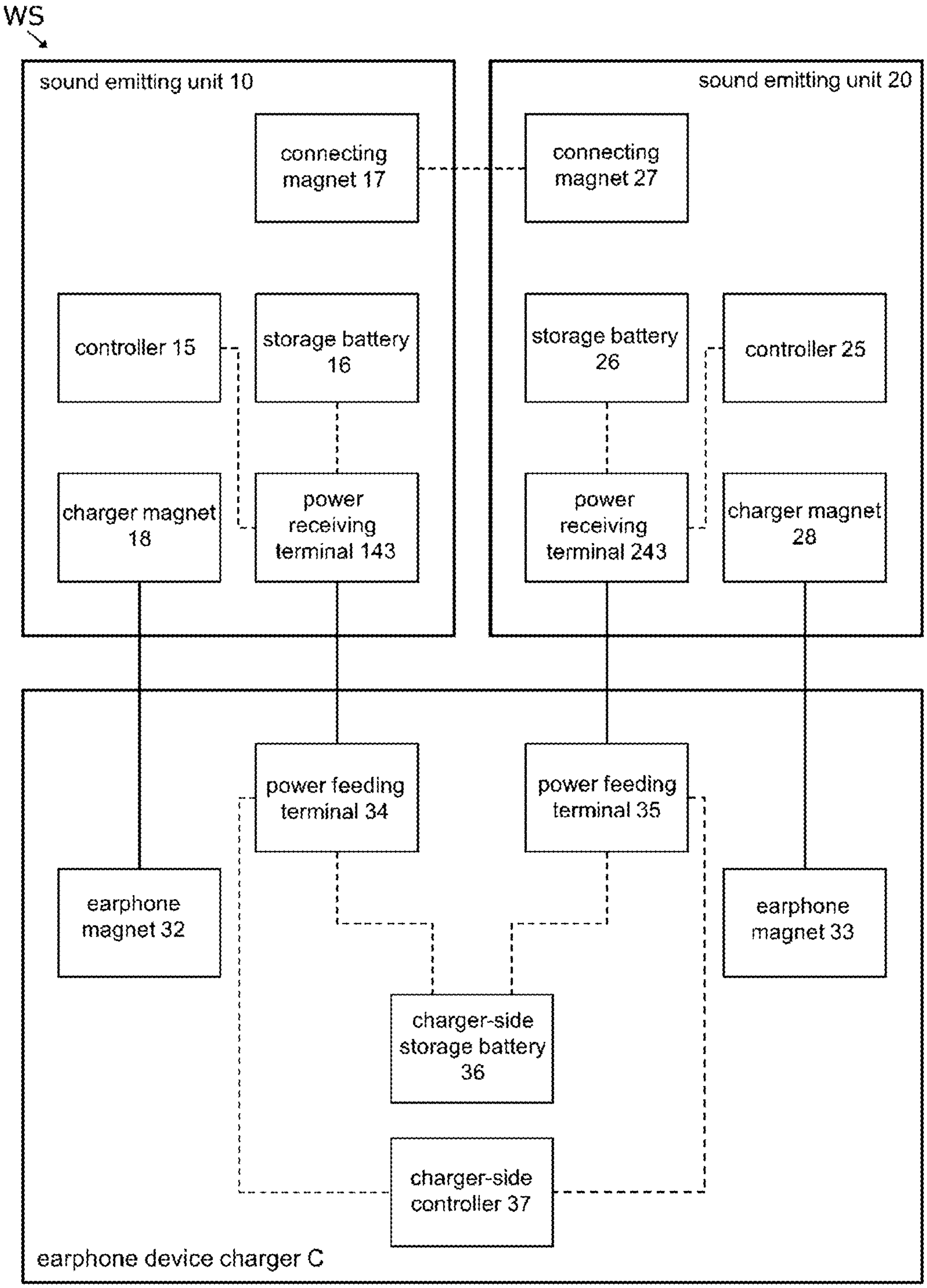
FIG. 7 is a functional block diagram of the wireless earphone system in FIG. 1.

FIG. 6 is an appearance view of the charger C. FIG. 7 is a functional block diagram of the wireless earphone system WS. FIG. 7 illustrates a state in which the present device 1 and the charger C are interconnected. The figure illustrates by omitting a portion of the configuration of the present device 1 for convenience of description.

The charger C functions as a case that accommodates the present device 1 and also functions as a charger that charges the present device 1. That is, the charger C charges the present device 1 while accommodating the present device 1. In the following description, "charging the present device 1" is to store power in the storage batteries 16 and 26, i.e., the storage batteries 16 and 26 are charged.

The charger C includes a charger main body 31, the first earphone magnet 32, the second earphone magnet 33, the first power feeding terminal 34, the second power feeding terminal 35, a charger-side storage battery 36, and a charger-side controller 37.

The charger main body 31 accommodates the first earphone magnet 32, the second earphone magnet 33, the first power feeding terminal 34, the second power feeding terminal 35, the charger-side storage battery 36, and the charger-side controller 37. The charger main body 31 includes accommodating portions 311 that accommodate each of the sound emitting units 10 and 20. The sound emitting units 10 and 20 are each accommodated in each accommodating portion 311, and thus the sound emitting units 10 and 20 are placed on the charger main body 31. When the sound emitting units 10 and 20 are each placed on (accommodated in) the charger main body 31, the sound emitting units 10 and 20 are interconnected by the connecting magnets 17 and 27. In a state in which each of the sound emitting units 10 and 20 is placed on the charger main body 31, the portion (the grip portion 113) of the housing 11 (the sound emitting unit 10) and the portion (the grip portion 213) of the housing 21 (the sound emitting unit 20) protrude to the outside of the charger main body 31. The charger main body 31 is made of synthetic resin such as ABS, for example. The charger main body 31 is an example of the main body in the present invention.

When the sound emitting unit 10 is accommodated in (placed on) the accommodating portion 311 (the charger C), the first earphone magnet 32 is attached to the charger magnet 18 by magnetic forces (i.e., magnetically attached). The first earphone magnet 32 positions the sound emitting unit 10 with respect to the charger C when the sound emitting unit 10 is connected to the charger C.

When the sound emitting unit 20 is accommodated in (placed on) the accommodating portion 311 (the charger C), the second earphone magnet 33 is attached to the charger magnet 28 by magnetic forces (i.e., magnetically attached). The second earphone magnet 33 positions the sound emitting unit 20 with respect to the charger C when the sound emitting unit 20 is connected to the charger C.

Herein, the magnitude (the magnetic attraction) of the first magnetic force is approximately 0.6 N to 0.7 N as described above. The magnitude (the magnetic attraction) of the second magnetic force is approximately 0.6 N to 0.7 N.

Furthermore, the magnitude (the magnetic attraction) of the magnetic force between the connecting magnet 17 and the connecting magnet 27 is approximately 1.7 N to 1.9 N. That is, the sum of the magnitude (the magnetic attraction) of the first magnetic force and the magnitude (the magnetic attraction) of the second magnetic force is smaller than the magnitude (the magnetic attraction) of the magnetic force between the connecting magnets 17 and 27. Furthermore, when the sound emitting units (10, 20) are connected to the charger C by the magnetic attachment between the charger magnets (18, 28) and the first and second earphone magnets (32, 33), the magnitude (the magnetic attraction) of the magnetic force between the sound emitting units (10, 20) and the charger C is approximately 1.0 N. That is, when the sound emitting units (10, 20) are connected to the charger C by the magnetic attachment between the charger magnets (18, 28) and the first and second earphone magnets (32, 33), the magnitude (the magnetic attraction) of the magnetic force between the sound emitting units (10, 20) and the charger C is smaller than the magnitude (the magnetic attraction) of the magnetic force between the connecting magnets 17 and 27.

The first power feeding terminal 34 is connected to the power receiving terminal 143 and feeds power to be stored in the storage battery 16 to the power receiving terminal 143. When the power is fed from the first power feeding terminal 34 to the power receiving terminal 143, the first power feeding terminal 34 is electrically connected to the power receiving terminal 143. The first power feeding terminal 34 is three pogo pins, for example, and a portion of each pogo pin is arranged in such a manner as to protrude into the accommodating portion 311. That is, the first power feeding terminal 34 is constituted by a plurality of terminal groups. The protruding portion of the first power feeding terminal 34 is retracted into the charger main body 31 when the protruding portion comes into contact with the power receiving terminal 143.

The second power feeding terminal 35 is connected to the power receiving terminal 243 and feeds power to be stored in the storage battery 26 to the power receiving terminal 243. When the power is fed from the second power feeding terminal 35 to the power receiving terminal 243, the second power feeding terminal 35 is electrically connected to the power receiving terminal 243. The second power feeding terminal 35 is three pogo pins, for example, and a portion of each pogo pin is arranged in such a manner as to protrude into the accommodating portion 311. That is, the second power feeding terminal 35 is constituted by a plurality of terminal groups. The protruding portion of the second power feeding terminal 35 is retracted into the charger main body 31 when the protruding portion comes into contact with the power receiving terminal 243.

The charger-side storage battery 36 stores (charges) the power to be supplied to the storage batteries 16 and 26 and supplies the power to the storage batteries 16 and 26. The charger-side storage battery 36 is accommodated in the charger main body 31. The power to be stored in the charger-side storage battery 36 is power from an external power source (not illustrated), for example.

The charger-side controller 37 controls the overall operation of the charger C. That is, the charger-side controller 37 controls the supply of power from the charger-side storage battery 36 to the storage batteries 16 and 26, based on the remaining power of the storage batteries 16 and 26, for example. The charger-side controller 37 includes, a CPU, a RAM, and a ROM, for example.

Removal Operation of Earphone Device (First Sound Emitting Unit, Second Sound Emitting Unit)

Next, a removal operation of the present device 1 from the charger C will be described. In the following description, FIGS. 1 to 3 will be referred to as appropriate.

Operation of Removing Both First Sound Emitting Unit and Second Sound Emitting Unit (1)

Figure 8:
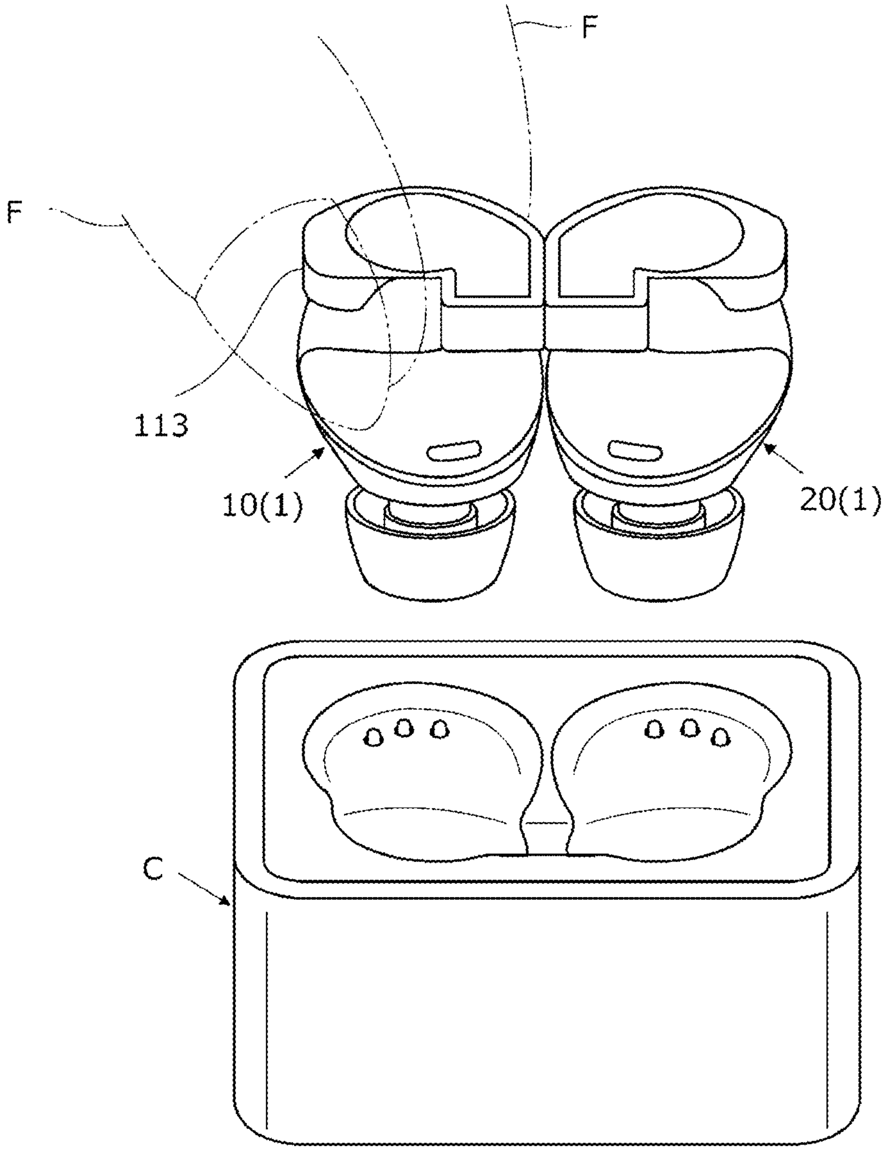
FIG. 8 is a diagram illustrating an example of an operation in which the earphone device in FIG. 1 is taken out of the earphone device charger.

FIG. 8 is a diagram illustrating an example of an operation in which the present device 1 is taken out of the charger C.

When each of the sound emitting units 10 and 20 is placed on (accommodated in) the charger main body 31, the sound emitting unit 10 and the sound emitting unit 20 are interconnected by the magnetic forces of the connecting magnets 17 and 27. As described above, the grip portions 113 and 213 are positioned at the portions protruding from the charger C when the grip portions 113 and 213 are accommodated in the charger C. In this state, a user of the present device 1 grips (pinches) the grip portion 113 of either the sound emitting units 10 or 20 (the sound emitting unit 10 in the present embodiment) with the finger F, and takes out (lifts) the sound emitting unit 10 from the charger C.

As described above, the sum of the magnitude (the magnetic attraction) of the first magnetic force and the magnitude of the second magnetic force is smaller than the magnitude (the magnetic attraction) of the magnetic force between the connecting magnets 17 and 27. Furthermore, when the sound emitting units (10, 20) are connected to the charger C by the magnetic attachment between the charger magnets (18, 28) and the first and second earphone magnets (32, 33), the magnitude (the magnetic attraction, approximately 1.0 N) of the magnetic force between the sound emitting units (10, 20) and the charger C is smaller than the magnitude (the magnetic attraction, approximately 1.7 N to 1.9 N) of the magnetic force between the connecting magnets 17 and 27. Moreover, in the present embodiment, the magnitude (the magnetic attraction) of the magnetic force between the connecting magnets 17 and 27 is larger than the magnitude (the magnetic attraction) of the magnetic force between the sound emitting units (10, 20) and the charger C by 0.5 N or more. Thus, when the user grips (pinches) the grip portion 113 and takes out (lifts) the sound emitting unit 10 from the charger C, the sound emitting unit 20 is taken out (lifted) from the charger C in a state of being connected to the sound emitting unit 10.

In this manner, the user can take out both of the sound emitting units 10 and 20 from the charger C only by one operation of taking out only the sound emitting unit 10 from the charger C. That is, the user does not need to take out the sound emitting units 10 and 20 separately from the charger C.

Note that the user may take out the second sound emitting unit from the charger by gripping only the grip portion of the second sound emitting unit. In this case, the first sound emitting unit is taken out of the charger in a state of being connected to the second sound emitting unit, similarly to the case where only the grip portion of the first sound emitting unit is gripped and taken out from the charger described above.

Operation of Removing Both First Sound Emitting Unit and Second Sound Emitting Unit (2)

Figure 9:
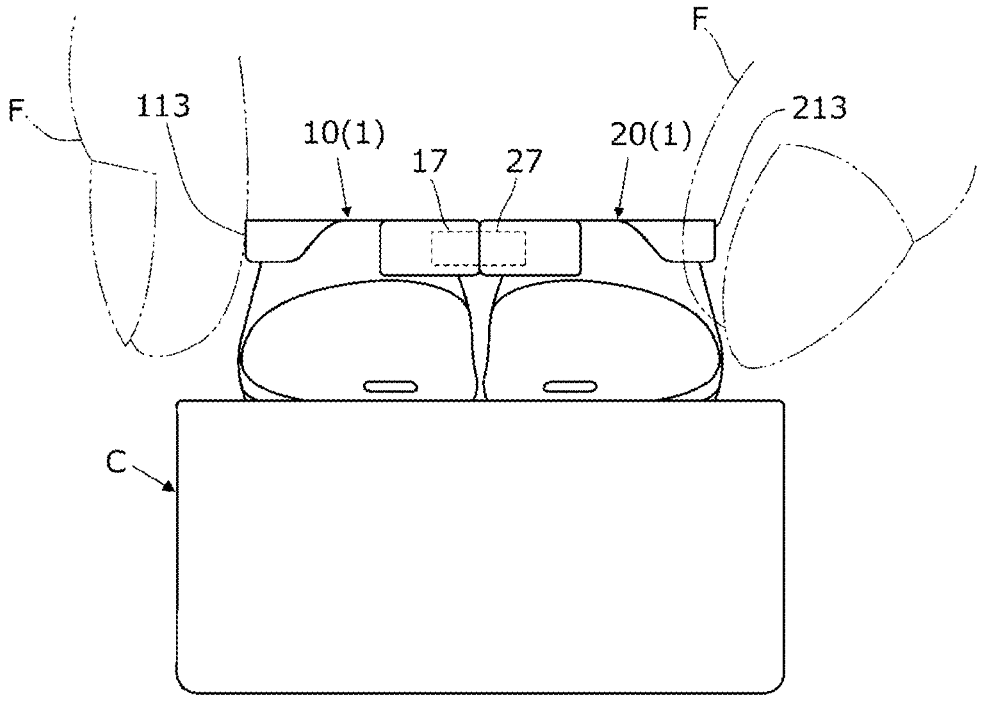
FIG. 9 is a diagram illustrating another example of the operation in which the earphone device in FIG. 1 is taken out of the earphone device charger.

FIG. 9 is a diagram illustrating another example of the operation in which the present device 1 is taken out of the charger C.

When each of the sound emitting units 10 and 20 is placed on (accommodated in) the charger main body 31, the sound emitting unit 10 and the sound emitting unit 20 are interconnected by the magnetic force of the connecting magnets 17 and 27. As described above, the grip portions 113 and 213 are positioned at the portions protruding from the charger C when the grip portions 113 and 213 are accommodated in the charger C. In this state, the user grips (pinches) the gripping portion 113 and 213 with the fingers F in such a manner as to simultaneously sandwich the sound emitting units 10 and 20 from the left and right direction (the left and right direction of the page in FIG. 9) and takes out the sound emitting units 10 and 20. In this case, as described above, the sound emitting unit 10 is connected to the sound emitting unit 20 by the magnetic force of the connecting magnets 17 and 27. In addition, the connecting magnets 17 and 27 are each arranged on the connecting surfaces 114 and 224, respectively. That is, in a state in which each of the sound emitting units 10 and 20 is placed on the charger main body 31, the connecting magnets 17 and 27 are arranged at the portion protruding from the charger C. As illustrated in FIG. 9, the connecting magnets 17 and 27 are positioned between the fingers F of the user (between the grip portion 113 (see FIG. 2) and the grip portion 213 (see FIG. 2)). Moreover, the connecting magnets 17 and 27 are positioned in the half (the upper half portion) of the housing 11 and 21 (the sound emitting units 10 and 20) protruding from the charger C and also positioned on the protruding direction side in the height direction (the vertical direction of the page in FIG. 9).

Thus, the user can take out the present device 1 from the charger C without separation of the present device 1. That is, the user does not need to take out the sound emitting units 10 and 20 separately from the charger C.

In addition, the grip portions 113 and 213 are gripped (pinched) by the user from the left and right direction (the left and right direction of the page in FIG. 9) and the sound emitting units 10 and 20 are taken out of the charger C. In this case, the connecting surfaces 114 and 214 abut on each other, and a force is applied to each of the connecting surfaces 114 and 214 in the direction substantially perpendicular (the left and right direction of the page in FIG. 9) with respect to the connecting surfaces 114 and 214. Thus, the misalignment of the connection between the sound emitting units 10 and 20 is reduced when the sound emitting units 10 and 20 are taken out. That is, the release of the attachment between the connecting magnets 17 and 27 is reduced. Thus, the electrical connection between the connecting magnets 17 and 27 is maintained, and the occurrence of so-called chatter is reduced.

Figure 10:
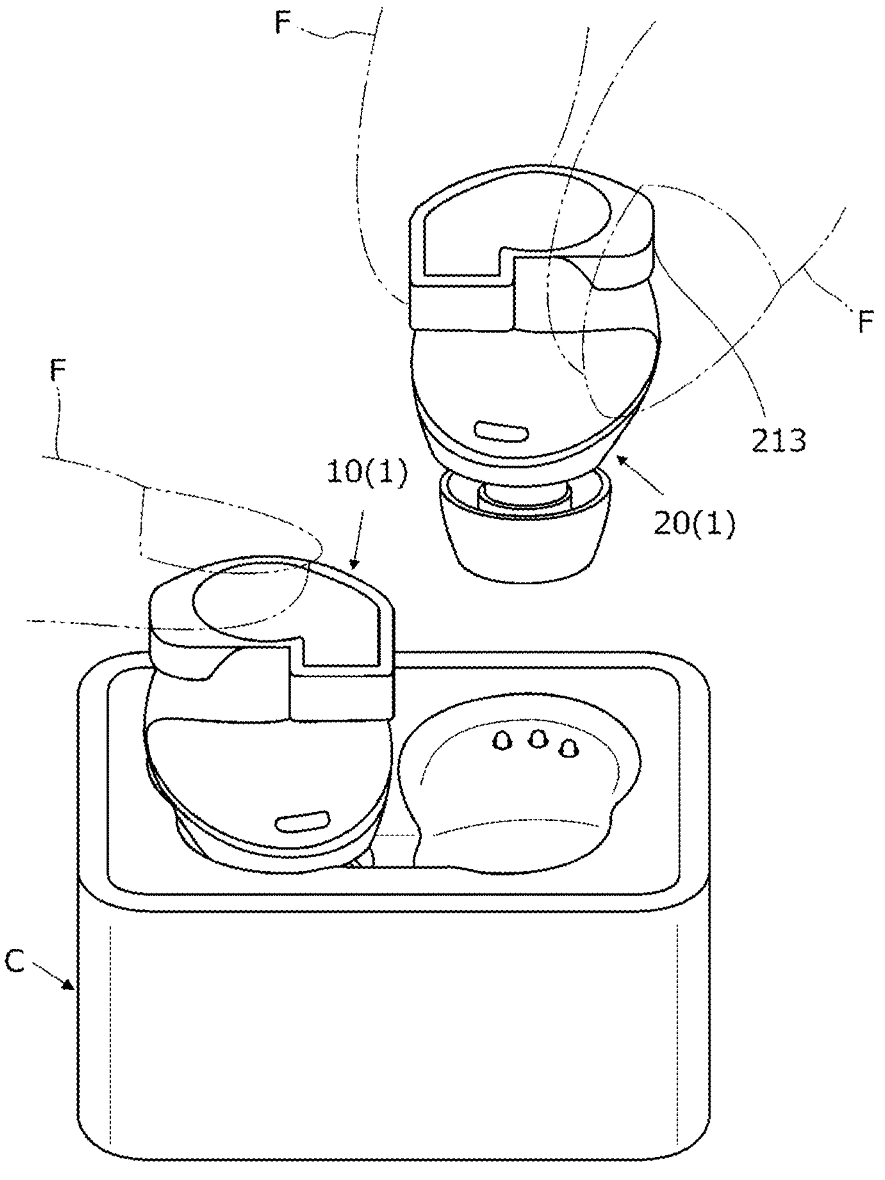
FIG. 10 is a diagram illustrating still another example of the operation in which the earphone device in FIG. 1 is taken out of the earphone device charger.

Removal Operation of Either First Sound Emitting Unit or Second Sound Emitting Unit FIG. 10 is a diagram illustrating still another example of the operation in which the present device 1 is taken out of the charger C. The figure illustrates the operation when the sound emitting unit 20 is taken out of the charger C.

First, a user presses the sound emitting unit 10 toward the charger C with the finger F.

Then, the user grips (pinches) the grip portion 213 of the sound emitting unit 20 with the finger F and takes out (lifts) the sound emitting unit 20 from the charger C.

Thus, the user can take out only the sound emitting unit 20 from the charger C. Furthermore, the user can hear the sound wave corresponding to the audio signal AS2 from the musical sound player (the sound source SS) by using only the sound emitting unit 20.

Note that the same applies to a case where the user takes out only the first sound emitting unit from the charger. In this case, the user presses the second sound emitting unit toward the charger with a finger. Then, the user grips the grip portion of the first sound emitting unit with fingers and takes out (lifts) the first sound emitting unit from the charger.

Operation of Earphone Device

Sound Wave Output Operation of Earphone Device

Next, the sound wave output operation of the present device 1 will be described with reference to FIG. 4. Herein, regarding the sound wave output operation of the present device 1, the sound wave output operation of the sound emitting unit 10 is common to the same operation of the sound emitting unit 20 except for the type of the audio signals (audio signals AS1 and AS2) from the sound source SS. Thus, the sound wave output operation of the present device 1 will be described below by using the sound wave output operation of the sound emitting unit 10 as an example. In the following, a state in which the power supply of the sound emitting unit is turned on will be described as an example.

The audio signal AS1 (the digital signal) from the sound source SS is transmitted to the communication circuit 141 of the sound emitting unit 10 via a wireless communication line. The communication circuit 141 transmits the received digital signal to the signal processing circuit 142.

The signal processing circuit 142 converts the digital signal transmitted from the communication circuit 141 to an analog signal and transmits the analog signal to the driver unit 13. The driver unit 13 outputs the sound wave corresponding to the analog signal transmitted from the signal processing circuit 142.

Herein, when the sound emitting units 10 and 20 are used simultaneously, i.e., when the audio signal AS1 is transmitted to the sound emitting unit 10 from the sound source SS and the audio signal AS2 is transmitted to the sound emitting unit 20, the sound waves output from the driver units 13 and 23 are stereo sound waves.

Note that when either the first sound emitting unit or the second sound emitting unit is used, the sound wave to be output from the first driver unit or the second driver unit is a mono sound wave.

Charging and Power Feeding Operation of Earphone Device

Next, a charging and power feeding operation of the present device 1 will be described. Herein, the charging and power feeding operation of the sound emitting unit 10 is common to the charging and power feeding operation of the sound emitting unit 20. Thus, the charging and power feeding operation of the present device 1 will be described by using the charging and power feeding operation of the sound emitting unit 10 as an example.

Figure 11:
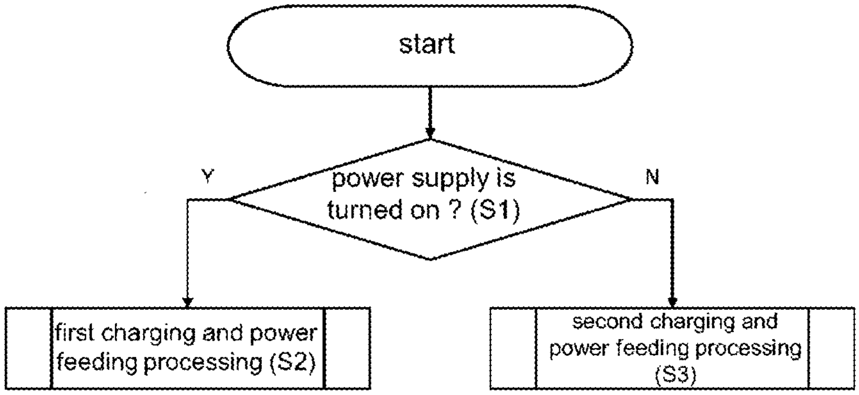
FIG. 11 is a flowchart illustrating a charging and power feeding operation of the earphone device in FIG. 1.

FIG. 11 is a flowchart illustrating a charging and power feeding operation of the present device 1.

First, the power supply determination unit 152 determines whether the sound emitting unit 10 is turned on or off (S1).

When the power supply determination unit 152 determines that the sound emitting unit 10 is turned on ("Y" in S1), the power feeding control unit 151 executes first charging and power feeding processing (S2). The "first charging and power feeding processing" is processing in which the controller 15 controls the power flow when the sound emitting unit 10 is turned on. That is, the first charging and power feeding processing is processing to be executed in a state where the sound emitting unit 10 is in a usable state. That is, when the first charging and power feeding processing is executed, the first power feeding is performed by the storage battery 16.

Figure 12:
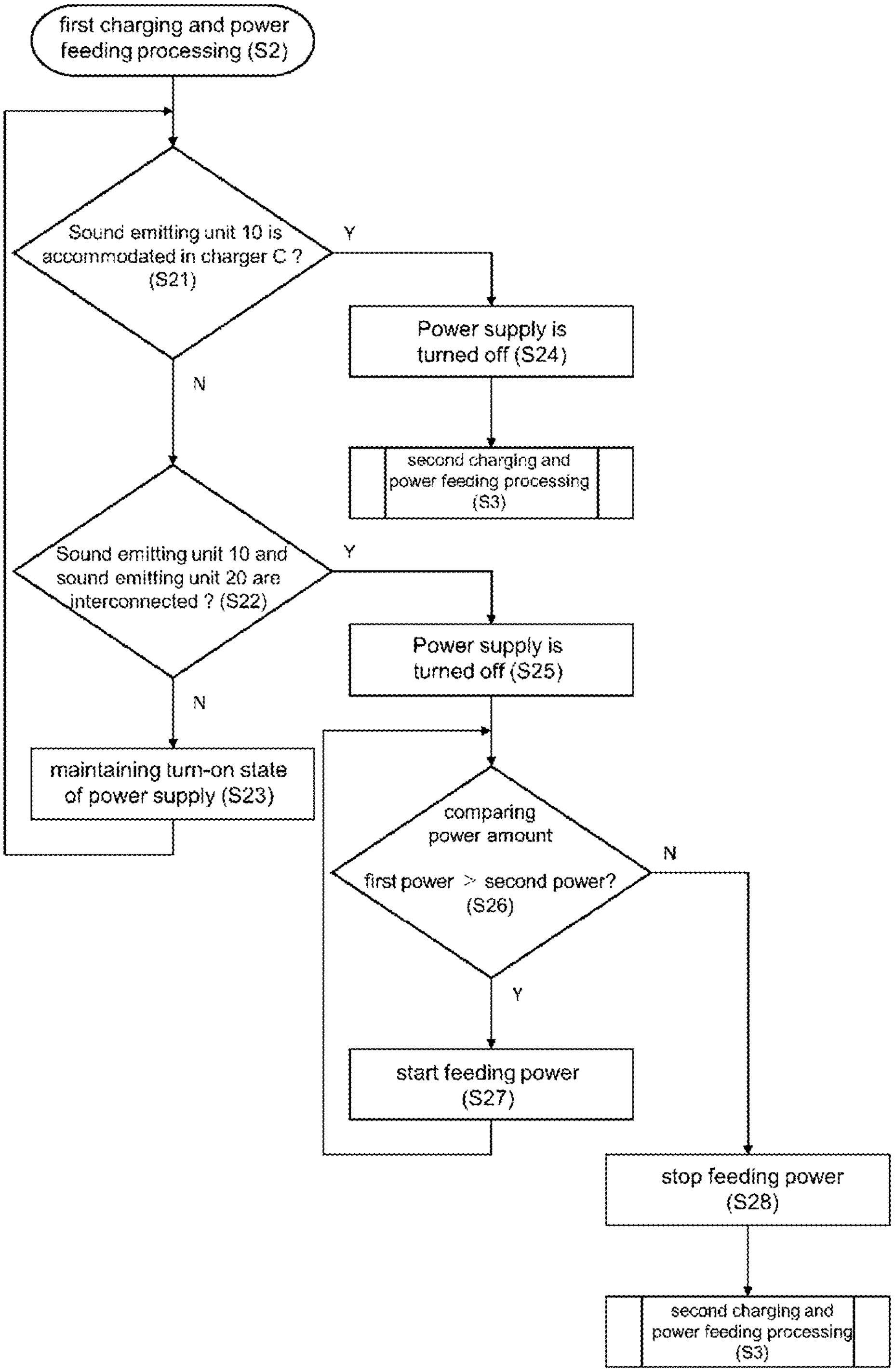
FIG. 12 is a flowchart of first charging and power feeding processing included in the flowchart in FIG. 11.

FIG. 12 is a flowchart of the first charging and power feeding processing S2. First, the charger connection determination unit 153 determines whether the sound emitting unit 10 is accommodated in the charger C by using known connection determination processing, for example (S21). The "known connection determination processing" is, for example, processing in which a sensing terminal (not illustrated) included in the charger C senses that the sound emitting unit 10 is accommodated in the charger C when the sensing terminal is connected to a connection terminal (not illustrated) included in the sound emitting unit 10, and the charger connection determination unit 153 determines the connection when the sensing terminal comes into contact with the connection terminal and becomes electrically connected to the connection terminal. The "sensing terminal (not illustrated) included in the charger C" is, for example, one terminal of the first power feeding terminal 34 including a plurality of terminal groups and one terminal of the second power feeding terminal 35 including a plurality of terminal groups. The charger connection determination unit 153 determines whether the sound emitting unit 10 is accommodated in the charger C, based on the sensed information (the sensed signal) from the sensing terminal.

When the charger connection determination unit 153 determines that the sound emitting unit 10 is not accommodated in the charger C ("N" in S21), the unit connection determination unit 154 determines whether the sound emitting unit 10 is connected to the sound emitting unit 20, i.e., whether the connecting magnet 17 is electrically connected to the connecting magnet 27 by using the sensing processing by the sensing sensor 144 (S22). That is, the unit connection determination unit 154 also functions as the connection determination unit in the present invention. The "sensing processing by the sensing sensor 144" is, for example, processing in which the sensing sensor 144 senses a magnetic field generated by the connecting magnet 27, and the sensed information (the sensed signal) is transmitted from the sensing sensor 144 to the unit connection determination unit 154 when the sensing sensor 144 senses the magnetic field generated by the connecting magnet 27. The unit connection determination unit 154 determines whether the connecting magnet 17 is electrically connected to the connecting magnet 27, based on the sensed information (the sensed signal) from the sensing sensor 144.

When the unit connection determination unit 154 determines that the sound emitting unit 10 is not connected to the sound emitting unit 20 (the connecting magnet 17 is not electrically connected to the connecting magnet 27) ("N" in S22), the power feeding control unit 151 maintains the turn-on state of the power supply (i.e., continues the first power feeding) (S23). In this state, the sound emitting unit 10 is in the usable state. Then, the first charging and power feeding processing (S2) returns to the processing (S21).

In contrast, when the charger connection determination unit 153 determines that the sound emitting unit 10 is accommodated in the charger C by using the known connection determination processing, for example ("Y" in S21), the power feeding control unit 151 turns off the power supply, i.e., turns off the first power feeding (S24). In this state, the power from the charger-side storage battery 36 (the charger C) is supplied to the storage battery 16 via the power receiving terminal 143, i.e., charging of the storage battery 16 starts. Then, the first charging and power feeding processing (S2) executes second charging and power feeding processing (S3).

When the unit connection determination unit 154 determines that the sound emitting unit 10 is connected to the sound emitting unit 20 by using the sensing processing by the sensing sensor 144 ("Y" in S22), the power feeding control unit 151 turns off the power supply, i.e., turns off the first power feeding (S25).

Then, the power comparator 155 compares the magnitude of the amount of the first power with the amount of the second power (S26).

When the amount of the first power is larger than the amount of the second power ("Y" in S26), the power feeding control unit 151 feeds (supplies) the first power to the storage battery 26 via the connecting magnets 17 and 27 (S27). In other words, the power feeding control unit 151 starts feeding the first power to the storage battery 26. Then, the first charging and power feeding processing (S2) returns to the processing (S26).

In contrast, when the amount of the first power is equal to or less than the amount of the second power ("N" in S26), the power feeding control unit 151 stops feeding the first power to the storage battery 26 (S28). In this case, for example, when the amount of the first power is less than the amount of the second power, the second power feeding control unit starts feeding the second power to the storage battery 16 via the connecting magnets 17 and 27. That is, the storage battery 16 is charged by receiving the second power. Then, the first charging and power feeding processing (S2) executes the second charging and power feeding processing (S3).

In this manner, in cases where the sound emitting units 10 and 20 are taken out of the charger C, the sound emitting unit 10 and the sound emitting unit 20 are interconnected, and the remaining power (stored power) of the storage battery 16 is larger than the remaining power (stored power) of the storage battery 26, the storage battery 16 feeds the first power to the storage battery 26 (i.e., the storage battery 26 is charged by receiving the first power from the storage battery 16). In contrast, in cases where the sound emitting units 10 and 20 are taken out of the charger C, the sound emitting unit 10 and the sound emitting unit 20 are interconnected, and the remaining power (the stored power) of the storage battery 16 is equal to or less than the remaining power (the stored power) of the storage battery 26, the storage battery 16 is charged by receiving the second power from the storage battery 26. That is, in cases where the sound emitting units 10 and 20 are taken out of the charger C and the sound emitting unit 10 and the sound emitting unit 20 are interconnected, the power is charged from the storage battery having a larger remaining power (the stored power) to the storage battery having a smaller remaining power (the stored power) between the remaining power (the stored power) of the storage battery 16 and the remaining power (the stored power) of the storage battery 26.

Referring now back to FIG. 11, in the processing S1, when the power supply determination unit 152 determines that the power supply of the sound emitting unit 10 is turned off ("N" in S1), the power feeding control unit 151 executes the second charging and power feeding processing (S3). The "second charging and power feeding processing" is processing in which the controller 15 controls the power flow when the power supply of the sound emitting unit 10 is turned off.

Figure 13:
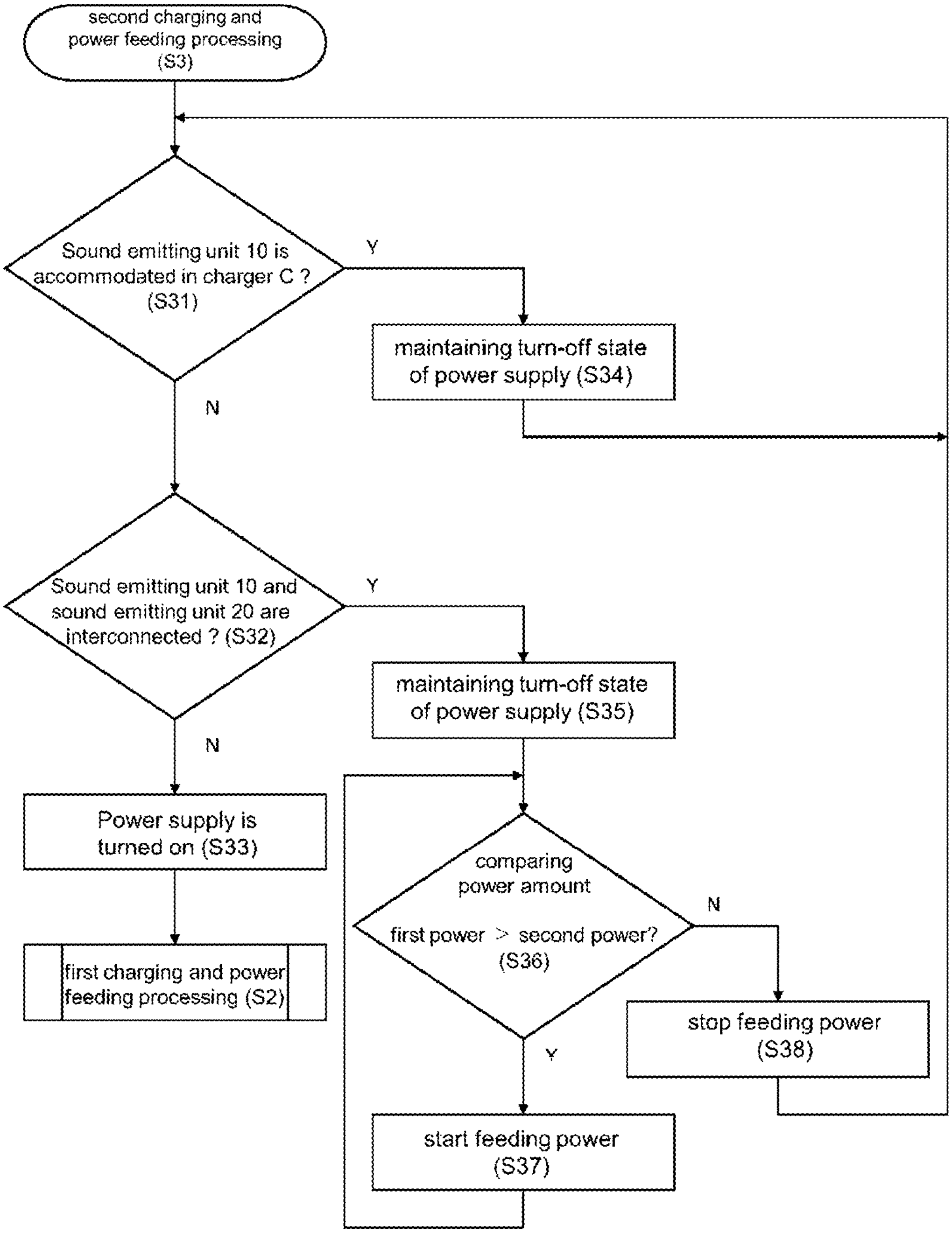
FIG. 13 is a flowchart of second charging and power feeding processing included in the flowchart in FIG. 11.

FIG. 13 is a flowchart of the second charging and power feeding processing S3. First, the charger connection determination unit 153 determines whether the sound emitting unit 10 is accommodated in the charger C by using known connection determination processing, for example (S31).

When the charger connection determination unit 153 determines that the sound emitting unit 10 is not accommodated in the charger C ("N" in S31), the unit connection determination unit 154 determines whether the sound emitting unit 10 is connected to the sound emitting unit 20, i.e., whether the connecting magnet 17 is electrically connected to the connecting magnet 27 by using the sensing processing by the sensing sensor 144 (S32).

When the unit connection determination unit 154 determines that the sound emitting unit 10 is not connected to the sound emitting unit 20, i.e., the connecting magnet 17 is not electrically connected to the connecting magnet 27 ("N" in S32), the power feeding control unit 151 turns on the power supply (turns on the first power feeding) (S33). Then, the second charging and power feeding processing (S3) executes the first charging and power feeding processing (S2).

In contrast, when the charger connection determination unit 153 determines that the sound emitting unit 10 is accommodated in the charger C by using known connection determination processing, for example ("Y" in S31), the power feeding control unit 151 maintains the turn-off state of the power supply (i.e., maintains the turn-off state of the first power feeding) (S34). In this state, the power from the charger-side storage battery 36 (the charger C) is supplied to the storage battery 16 via the power receiving terminal 143 (i.e., the charging of the storage battery 16 is maintained). Then, the second charging and power feeding processing (S3) returns to the processing (S31).

When the unit connection determination unit 154 determines that the sound emitting unit 10 is connected to the sound emitting unit 20 by using the sensing processing by the sensing sensor 144 ("Y" in S32), the power feeding control unit 151 maintains the turn-off state of the power supply (i.e., maintains the turn-off state of the first power feeding) (S35).

Then, the power comparator 155 compares the magnitude of the amount of the first power with the amount of the second power (S36).

When the amount of the first power is larger than the amount of the second power ("Y" in S36), the power feeding control unit 151 feeds the first power to the storage battery 26 via the coupling magnets 17 and 27 (S37). In other words, the power feeding control unit 151 starts feeding the first power to the storage battery 26. Then, the second charging and power feeding processing (S3) returns to the processing (S36).

In contrast, when the amount of the first power is equal to or less than the amount of the second power ("N" in S36), the power feeding control unit 151 stops feeding the first power to the storage battery 26 (S38). In this case, for example, when the amount of the first power is smaller than the amount of the second power, the second power feeding control unit starts feeding the second power to the storage battery 16. That is, the storage battery 16 is charged by receiving the second power. Then, the second charging and power feeding processing (S3) returns to the processing S31.

In this manner, in cases where the sound emitting units 10 and 20 are taken out of the charger C, the sound emitting unit 10 and the sound emitting unit 20 are interconnected, and the remaining power (the stored power) of the storage battery 16 is larger than the remaining power (the stored power) of the storage battery 26, the storage battery 16 feeds the first power to the storage battery 26 (i.e., the storage battery 26 is charged by receiving the first power from the storage battery 16). In contrast, when the sound emitting unit 10 and 20 are taken out of the charger C, the sound emitting unit 10 and the sound emitting unit 20 are interconnected, and the remaining power (the stored power) of the storage battery 16 is equal to or less than the remaining power (the stored power) of the storage battery 26, the storage battery 16 is charged by receiving the second power from the storage battery 26. That is, in cases where the sound emitting units 10 and 20 are taken out of the charger C and the sound emitting unit 10 and the sound emitting unit 20 are interconnected, the power is charged from the storage battery having a larger remaining power (the stored power) to the storage battery having a smaller remaining power (the stored power) between the remaining power (the stored power) of the storage battery 16 and the remaining power (the stored power) of the storage battery 26.

In the operation of the present device 1, the power feeding control unit 151 controls the turn-on and turn-off of the power supply, i.e., controls on and off of the first power feeding, based on the determination results of each of the charger connection determination unit 153 and the unit connection determination unit (connection determination unit) 154 (S23, S25, S33, S35). Furthermore, the power feeding control unit 151 controls the supply of the first power (the second power) to the storage battery 26 (the storage battery 16), based on the comparison result by the power comparator 155 (S27, S28, S37, S38). As a result, the present device 1 is able to automatically detect whether the sound emitting unit (10, 20) and the charger C are interconnected as well as whether the sound emitting units 10 and 20 are interconnected, and the present device 1 is able to control the turn-on and turn-off of the power supply. Accordingly, in the present device 1, unnecessary consumption (discharge) of power in cases where the sound emitting units 10 and 20 are not in use and extreme consumption of power of only one of the sound emitting units is reduced. Furthermore, the convenience of the present device 1 for a user is improved.

CONCLUSION

According to the embodiment described above, the present device 1 includes the sound emitting unit 10 and the sound emitting unit 20 physically separable from the sound emitting unit 10. The sound emitting unit 10 includes the connecting magnet 17, and the sound emitting unit 20 includes the connecting magnet 27. The sound emitting unit 10 is connected to the sound emitting unit 20 by the attachment due to the magnetic forces of the connecting magnet 17 and the connecting magnet 27. The sound emitting units 10 and 20 are interconnected by the magnetic forces, and thus, even though a user carries the present device 1 in a pocket of a bag or clothing, the sound emitting units 10 and 20 are prevented from being separated in the pocket of the bag or the clothing. As a result, the loss of the sound emitting units 10 and 20 is also prevented. That is, after using the present device 1, the user does not have to accommodate the present device 1 in the charger C every time.

According to the embodiment described above, the sound emitting unit 10 includes the power feeding control unit 151. The power feeding control unit 151 turns off the first power feeding when the storage battery 16 is not being charged (e.g., when the present device 1 is not accommodated in the charger C) and when the sound emitting unit 10 is connected to the sound emitting unit 20. That is, the power supply of the sound emitting unit 10 is turned off. In contrast, the power feeding control unit 151 turns on the first power feeding when the storage battery 16 is not being charged and the sound emitting unit 10 is not connected to the sound emitting unit 20. That is, the power supply of the sound emitting unit 10 is turned on. That is, the present device 1 is able to control the turn-on and turn-off of the first power feeding even though the sound emitting unit 10 is not accommodated in the charger C. In addition, the sound emitting unit 10 is able to control the turn-on and the turn-off of the first power feeding even through the power supply is not controlled by a physical button. Thus, unnecessary discharge of the storage battery 16 is reduced, and power saving of the storage battery 16 is achieved. The same effect is achieved for the sound emitting unit 20.

According to the embodiment described above, the sound emitting unit 10 includes the unit connection determination unit 154. The power feeding control unit 151 controls the first power feeding, based on the determination result of the unit connection determination unit 154. That is, for example, when the unit connection determination unit 154 determines that the sound emitting unit 10 and the sound emitting unit 20 are interconnected, the power feeding control unit 151 turns off the first power feeding. In contrast, when the unit connection determination unit 154 determines that the sound emitting unit 10 and the sound emitting unit 20 are not interconnected, the power feeding control unit 151 turns on the first power feeding. In this manner, the present device 1 is able to control the first power feeding without accommodating the sound emitting unit 10 in the charger C. In addition, the sound emitting unit 10 is able to control the first power feeding even though the turn-on/turn-off of the power supply is not controlled by a physical button. Thus, unnecessary discharge of the storage battery 16 is reduced, and power saving of the storage battery 16 is achieved. The same effect is achieved for the sound emitting unit 20.

According to the embodiment described above, the sound emitting unit 10 includes the charger connection determination unit 153. The power feeding control unit 151 controls the first power feeding, based on the determination result of the charger connection determination unit 153. That is, for example, when the charger connection determination unit 153 determines that the sound emitting unit 10 is connected to the charger C (i.e., when the sound emitting unit 10 is accommodated in the charger C), the power feeding control unit 151 turns off the power supply of the sound emitting unit 10. In contrast, when the charger connection determination unit 153 determines that the sound emitting unit 10 is not connected to the charger C (i.e., when the sound emitting unit 10 is not accommodated in the charger C) and when the unit connection determination unit 154 determines that the sound emitting unit 10 and the sound emitting unit 20 are not interconnected, the power feeding control unit 151 turns on the power supply of the sound emitting unit 10. As a result, unnecessary discharge of the storage battery 16 is reduced, and power saving of the storage battery 16 is achieved. The same effect is achieved for the sound emitting unit 20.

According to the embodiment described above, the storage battery 16 is charged when the sound emitting unit 10 is connected to the sound emitting unit 20. That is, for example, when the amount of the first power is less than the amount of the second power, the sound emitting unit 10 not accommodated in the charger C is connected to the sound emitting unit 20, allowing the storage battery 26 to charge the storage battery 16 (i.e., the storage battery 16 receives the second power). When the amount of the first power is larger than the amount of the second power, the sound emitting unit 10 is connected to the sound emitting unit 20, allowing the storage battery 16 to supply the first power to the storage battery 26. That is, the present device 1 is able to control the charging amount of the storage batteries 16 and 26 even though the sound emitting units 10 and 20 are not accommodated in the charger C.

According to the embodiment described above, the sound emitting unit 10 includes the power comparator 155. The power feeding control unit 151 controls the feeding of the first power to the storage battery 26, based on the comparison result of the power comparator 155. That is, for example, when the amount of the first power is larger than the amount of the second power as a result of comparison by the power comparator 155, the sound emitting unit 10 is connected to the sound emitting unit 20, allowing the battery 26 to be charged by the battery 16 (i.e., the battery 26 receives the first power). The power feeding of the first power to the storage battery 26 is controlled. That is, the present device 1 is able to control the charging amount of the storage battery 26 even though the sound emitting units 10 and 20 are not accommodated in the charger C.

According to the embodiment described above, the first power feeding is controlled to be turned off by the control of the power feeding control unit 151 during the charging of the storage battery 16. Thus, unnecessary discharge from the storage battery 16 is reduced during the charging of the battery 16.

According to the embodiment described above, the sound emitting unit 10 is connected to the charger C by the magnetic forces of the charger magnet 18 and the first earphone magnet 32 of the charger C. The sound emitting unit 20 is connected to the charger C by the magnetic forces of the charger magnet 28 and the second earphone magnet 33 of the charger C. The sum of the magnitude (the magnetic attraction) of the first magnetic force and the magnitude (the magnetic attraction) of the second magnetic force is smaller than the magnitude of the magnetic force between the connecting magnets 17 and 27. Thus, when only the sound emitting unit 10 is gripped (pinched) and taken out of the charger C (i.e., when lifted), the sound emitting unit 20 is taken out (lifted) from the charger C in a state of being connected to the sound emitting unit 10. In this manner, in the present device 1, either the sound emitting unit 10 or 20 is taken out, the other unit is also taken out simultaneously. Accordingly, a user does not need to take out the sound emitting units 10 and 20 separately from the charger C, and the removal operation of the sound emitting units 10 and 20 from the charger C is simplified.

According to the embodiment described above, the connecting magnets 17 and 27 function as electrical terminals, and the connecting magnet 17 is electrically connected to the connecting magnet 27 when the sound emitting unit 10 is connected to the sound emitting unit 20. In this case, the unit connection determination unit 154 determines whether the connecting magnet 17 is electrically connected to the connecting magnet 27, thereby determining whether the sound emitting unit 10 and the sound emitting unit 20 are interconnected. That is, the unit connection determination unit 154 also functions as the connection determination unit in the present invention. When the unit connection determination unit 154 determines that the connecting magnet 17 is electrically connected to the connecting magnet 27 (i.e., when the unit connection determination unit 154 determines that the sound emitting unit 10 is connected to the sound emitting unit 20), the power feeding control unit 151 turns off the first power feeding. Thus, as described above, the present device 1 is able to control the turn-on and the turn-off of the power feeding even though the sound emitting unit 10 is not accommodated in the charger C. In addition, the sound emitting unit 10 is able to control the turn-on and the turn-off of the first power feeding even though the turn-on and the turn-off of the power supply is not controlled by a physical button. Thus, unnecessary discharge of the storage battery 16 is reduced, and power saving of the storage battery 16 is achieved. The same effect is achieved for the sound emitting unit 20.

According to the embodiment described above, the storage battery 16 (the sound emitting unit 10) feeds the first power to the storage battery 26 via the connecting magnets 17 and 27. The storage battery 16 (the sound emitting unit 10) also receives the second power via the connecting magnets 17 and 27. Thus, in the present device 1, even though the present device 1 is not connected to the charger C, the power storage amount of either the storage batteries 16 or 26 does not decrease drastically.

According to the embodiment described above, when the sound emitting unit 10 is connected to the sound emitting unit 20, the shape of the sound emitting unit 10 has a mirror-image relationship with the shape of the sound emitting unit 20 with the connecting surface 114 serving as a plane of symmetry. Thus, when the sound emitting unit 10 is connected to the sound emitting unit 20, the size of the present device 1 becomes compact. As a result, the portability of the present device 1 is improved. The present device 1 also has an excellent design at the time of connection.

According to the embodiment described above, the connecting magnet 17 includes the north pole magnet (the first north pole terminal) 171 and the south pole magnet (the first south pole terminal) 172. The connecting magnet 27 includes a north pole magnet (the second north pole terminal) 271 and the south pole magnet (the second south pole terminal) 272. The north pole magnet 271 is attached to the south pole magnet 172 by the magnetic forces (i.e., magnetically attached) and the south pole magnet 272 is attached to the north pole magnet 171 by the magnetic forces (i.e., magnetically attached). That is, the sound emitting unit 10 is connected to the sound emitting unit 20 by the magnetic forces of the north pole magnet 171 and the south pole magnet 272 and by the magnetic forces of the south pole magnet 172 and the north pole magnet 271. That is, the sound emitting unit 10 is attached to the sound emitting unit 20 by the magnetic forces of the two pairs of magnets. Thus, the misalignment of the attachment between the connecting magnets 17 and 27 is reduced. Thus, when the sound emitting unit 10 is connected to the sound emitting unit 20, the size of the present device 1 becomes compact.

According to the embodiment described above, the sound emitting units 10 and 20 include the grip portions 113 and 213, respectively. The connecting magnets 17 and 27 are arranged on the connecting surfaces 114 and 214, respectively. The connecting surfaces 114 and 214 are arranged at the portions of the housings 11 and 21 protruding from the charger C when the present device 1 is accommodated in the charger C, i.e., the portions of the housings 11 and 21 (the main body 111 and 211), respectively. The grip portions 113 and 213 are the portions of the housings 11 and 21 protruding from the charger C when the present device 1 is accommodated in the charger C, i.e., the portions of the housings 11 and 21 (the main bodies 111 and 211), respectively. In other words, the connecting magnets 17 and 27 are arranged on the grip portions 113 and 213, respectively. When each of the sound emitting units 10 and 20 is placed on the charger main body 31, the connecting magnets 17 and 27 are positioned (arranged) between the grip portion 113 and the grip portion 213. Moreover, the connecting magnets 17 and 27 are positioned in the upper half portion of the housings 11 and 21 (the sound emitting units 10 and 20) protruding from the charger C in the height direction (the vertical direction of the page in FIG. 9). Thus, for example, when the grip portion 113 or 213 is gripped by a user and the sound emitting unit 10 and 20 is taken out of the charger C, the misalignment of the connection between the sound emitting units 10 and 20 is reduced while the sound emitting unit 10 and 20 is being taken out. That is, the release of the attachment between the connecting magnets 17 and 27 is reduced. Thus, the electrical connection between the connecting magnets 17 and 27 is maintained, and the occurrence of so-called chatter is reduced.

Note that, in the embodiment described above, the present device 1 is accommodated in the charger C when charged by the charger C. Alternatively, in the present invention, the earphone device may be charged by being placed on a charging pad compliant with the “Qi” standard, for example.

In the embodiment described above, the connecting magnet 17 includes the north pole magnet 171 and the south pole magnet 172. The connecting magnet 27 includes the north pole magnet 271 and the south pole magnet 272. Alternatively, in the present invention, the first connecting magnet may be constituted by one or more magnets (terminals) that function as the north pole, and the second connecting magnet may be constituted by one or more magnets (terminals) that function as the south pole. The first connecting magnet may be also constituted by one or more magnets (terminals) that function as the south pole, and the second connecting magnet may be constituted by one or more magnets (terminals) that function as the north pole.

In the embodiment described above, the sound emitting unit 10 functions as the left sound emitting unit worn on the left ear of the user, and the sound emitting unit 20 functions as the right sound emitting unit worn on the right ear of the user. Alternatively, in the present invention, the first sound emitting unit may function as the right sound emitting unit worn on the right ear of the user, and the second sound emitting unit may function as the left sound emitting unit worn on the left ear of the user.

In the present invention, the first connecting magnet does not need to be exposed from the first main body (the first housing) and the second connecting magnet does not need to be exposed from the second main body (the second housing). In this case, similarly to the configuration of the embodiment described above, the first sensing sensor of the first sound emitting unit may sense the magnetic field generated by the second connecting magnet, and the second sensing sensor of the second sound emitting unit may sense the magnetic field generated by the first connecting magnet.

In the present invention, “the magnitude (the magnetic attraction) of the magnetic force between the first connecting magnet and the second connecting magnet”, “the magnitude (the magnetic attraction) of the magnetic force (the first magnetic force) between the first charger magnet and the first earphone magnet”, and “the magnitude (the magnetic attraction) of the magnetic force (the second magnetic force) between the second charger magnet and the second earphone magnet” are not limited to each magnitude (each magnetic attraction) of the present embodiment as long as the magnitude relationship described in the above-described embodiment is satisfied.

In the embodiment described above, the first sensing sensor of the first sound emitting unit senses the magnetic field to be generated by the second connecting magnet, and the second sensing sensor of the second sound emitting unit senses the magnetic field to be generated by the first connecting magnet. Alternatively, in the present invention, the first sensing sensor of the first sound emitting unit and the second sensing sensor of the second sound emitting unit may sense the electrical connection by attaching the first connecting magnet to the second connecting magnet.

In the embodiment described above, the power feeding control unit 151 feeds the first power to the storage battery 26 or the second power to the storage battery 16 by comparing the amount of the first power with the amount of the second power by the power comparator 155. Alternatively, in the present invention, the first power feeding control unit may control the power feeding to each of the storage batteries (the first storage battery and the second storage battery) depending on the difference between the amount of the first power and the amount of the second power. That is, for example, when the difference between the amount of the first power and the amount of the second power is within a predetermined range, the first power feeding control unit may control the power feeding in order not to feed the power to each of the storage batteries (the first storage battery and the second storage battery) to prevent the loss of power. In place of the operation of the power feeding control unit 151 described above, in the present invention, the first power feeding control unit may also control the power feeding to each of the storage batteries (the first storage battery and the second storage battery) to prevent the loss of power when the remaining power (the stored power) of the first storage battery is less than predetermined remaining power (stored power) or when the remaining power (the stored power) of the second storage battery is less than predetermined remaining power (stored power). That is, the first power feeding control unit may control the power feeding in order not to feed the first power to the second storage battery when the remaining power (the stored power) of the second storage battery is less than the predetermined remaining power (the stored power), for example. Similarly, the first power feeding control unit may control the power feeding in order not to feed the second power to the first storage battery when the remaining power (the stored power) of the first storage battery is less than the predetermined remaining power (the stored power).

In the embodiment described above, the sound emitting units 10 and 20 cause the connecting magnets 17 and 27 to function as the electrical terminals and interconnect the connecting magnets 17 and 27, thereby causing the connecting magnets 17 and 27 to be electrically interconnected. Alternatively, in the present invention, the first sound emitting unit and the second sound emitting unit may include a connection terminal for electrically interconnecting the first sound emitting unit and the second sound emitting unit, separately from the first connecting magnet and the second connecting magnet.

Modification Example (1) of Earphone Device

Figure 14:
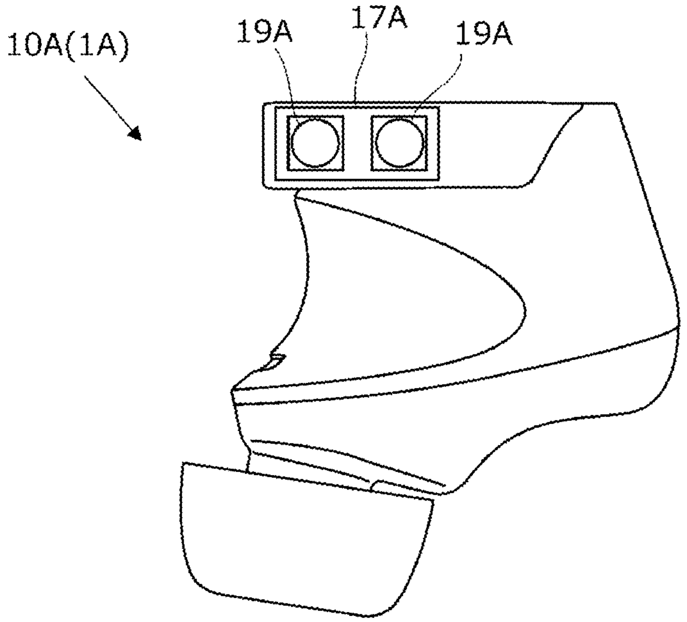
FIG. 14 is a schematic diagram illustrating a modification example of the earphone device according to one or more embodiments of the present invention.

FIG. 14 is a schematic diagram illustrating a modification example of the earphone device according to one or more embodiments of the present invention. For convenience of description, the figure schematically illustrates a first sound emitting unit 10A that is a modification example of the first sound emitting unit 10 as an earphone device 1A that is the modification example of the present device 1. A configuration of a modification example of the second sound emitting unit (not illustrated) is common to the configuration of the first sound emitting unit 10A, and thus a description thereof will be omitted. The figure illustrates that the first sound emitting unit 10A includes a first connecting magnet 17A and a first connecting terminal 19A. The other configurations of the first sound emitting unit 10A are common to the configuration of the sound emitting unit 10, and thus a description thereof will be omitted.

The first connecting magnet 17A is used for attaching the first sound emitting unit 10A to the second sound emitting unit. The first connecting magnet 17A is a north pole magnet or a south pole magnet. The first connection terminal 19A is electrically connected to a second connection terminal (not illustrated) of the second sound emitting unit. That is, when the first sound emitting unit 10A and the second sound emitting unit are interconnected by the magnetic forces of the first connecting magnet 17A and the second connecting magnet (not illustrated), the first connecting terminal 19A is electrically connected to the second connecting terminal. In this case, for example, the first unit connection determination unit (not illustrated) need not have a function as the connection determination unit. In this case, for example, the first sound emitting unit 10A may be configured to separately include the connection determination unit that determines whether the first connecting terminal 19A is electrically connected to the second connecting terminal.

In the embodiment described above, when the sound emitting unit 10 is connected to the sound emitting unit 20, the shape of the sound emitting unit 10 has a mirror-image relationship with the shape of the sound emitting unit 20 with the connecting surface serving as a plane of symmetry. Alternatively, in the present invention, when the first sound emitting unit is connected to the second sound emitting unit, the shape of the first sound emitting unit may be point-symmetric to the shape of the second sound emitting unit with a virtual center point (P) as the center. Note that "point symmetry" includes not only a case where two elements (e.g., the sound emitting unit 10 and the sound emitting unit 20) are in a geometrically exact point symmetry relationship, but also a case where a part of these two elements has a relationship that is not geometrically exactly point symmetry. That is, the point symmetry includes a case that is not completely point symmetry. That is, the point symmetry includes a case where the two elements are in a substantially point-symmetric relationship as a whole.

Modification Example (2) of Earphone Device

Figure 15:
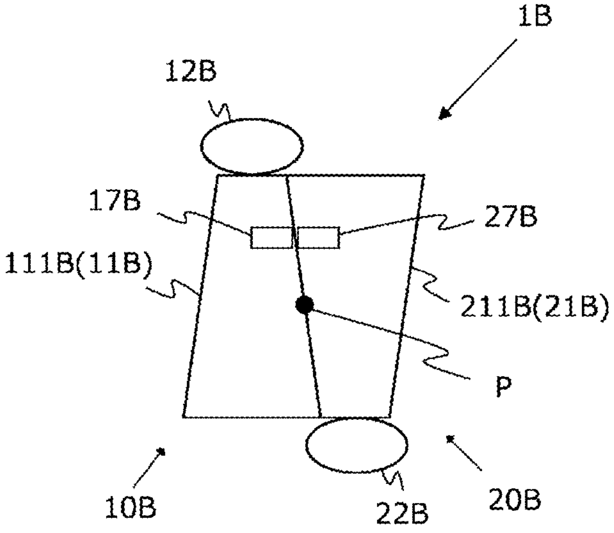
FIG. 15 is a schematic diagram illustrating another modification example of the earphone device according to one or more embodiments of the present invention.

FIG. 15 is a schematic diagram illustrating a modification example of the earphone device according to one or more embodiments of the present invention. For convenience of description, the figure schematically illustrates a first sound emitting unit 10B and a second sound emitting unit 20B that are the modification examples of the first sound emitting unit 10 and the second sound emitting unit 20 as an earphone device 1B that is the modification example of the present device 1. The figure illustrates that the first sound emitting unit 10B includes a first housing 11B, a first earpiece 12B, and a first connecting magnet 17B, and the second sound emitting unit 20B includes a second housing 21B, a second earpiece 22B, and a second connecting magnet 27B. The figure illustrates that the shape of the first sound emitting unit 10B is point-symmetric to the shape of the second sound emitting unit 20B with the virtual center point P as the center. The other configurations of the first sound emitting unit 10B and the second sound emitting unit 20B are common to the configurations of the sound emitting units 10 and 20, and thus a description thereof will be omitted.

The first housing 11B accommodates the first connecting magnet 17B and the like included in the first sound emitting unit 10B. The first housing 11B includes a first main body 111B. The first main body 111B accommodates the first connecting magnet 17B and the like included in the first sound emitting unit 10B.

The first earpiece 12B comes into close contact with the inner wall of the ear canal of a user in the worn state. The first earpiece 12B is attached to an outer peripheral surface of a first sound conduit (not illustrated).

The first connecting magnet 17B is a magnet used for interconnecting the first sound emitting unit 10B and the second sound emitting unit 20B. The first connecting magnet 17B is attached to a second connecting magnet 27B described later by the magnetic forces (i.e., magnetically attached), allowing the first sound emitting unit 10B to be connected to the second sound emitting unit 20B.

The second housing 21B accommodates the second connecting magnet 27B and the like included in the second sound emitting unit 20B. The second housing 21B includes a second main body 211B. The second main body 211B accommodates the second connecting magnet 27B and the like included in the second sound emitting unit 20B.

The second earpiece 22B comes into close contact with the inner wall of the ear canal of a user in the worn state. The second earpiece 22B is attached to an outer peripheral surface of a second sound conduit (not illustrated).

The second connecting magnet 27B is a magnet used for interconnecting the second sound emitting unit 20B and the first sound emitting unit 10B.

As illustrated in FIG. 15, when the first sound emitting unit 10B is connected to the second sound emitting unit 20B, the shape of the first sound emitting unit 10B is point-symmetric to the shape of the second sound emitting unit 20B with the virtual center point Pas the center. In this case, the first connecting magnet 17B is arranged at a position corresponding to the second connecting magnet 27B when the first sound emitting unit 10B is connected to the second sound emitting unit 20B in the first main body 111B (the first housing 11B). In addition, the second connecting magnet 27B is arranged at a position corresponding to the first connecting magnet 17B when the first sound emitting unit 10B is connected to the second sound emitting unit 20B in the second main body 211B (the second housing 21B). Thus, when the first sound emitting unit 10B is connected to the second sound emitting unit 20B, the size of the earphone 1B becomes compact. As a result, the portability of the earphone device 1B is improved.

REFERENCE SIGNS LIST

1, 1A, 1B Earphone device
10, 10A, 10B First sound emitting unit
11, 11B First housing
111, 111B First main body
112 First sound conduit
113 First grip portion
13 First driver unit
14 First circuit board
141 First communication circuit (First antenna)
15 First controller
151 Power feeding control unit
153 Charger connection determination unit
154 Unit connection determination unit (Connection determination unit)
155 Power comparator
16 First storage battery
17, 17A, 17B First connecting magnet (First magnet, First terminal)
171 North pole magnet (First north pole terminal)
172 South pole magnet (First south pole terminal)
18 First charger magnet
20, 20A, 20B Second sound emitting unit
21, 21B Second housing
211, 211B Second main body
212 Second sound conduit
213 Second grip portion
23 Second driver unit
24 Second circuit board
241 Second communication circuit (Second antenna)
25 Second controller
26 Second storage battery
27, 27A, 27B Second connecting magnet (Second magnet, Second terminal)
271 North pole magnet (Second north pole terminal)
272 South pole magnet (Second south pole terminal)
28 Second charger magnet
31 Charger body (Main body)
32 First earphone magnet
33 Second earphone magnet
34 First power feeding terminal
35 Second power feeding terminal
36 Charger-side storage battery
37 Charger-side controller
C Earphone device charger (Charger)
P Virtual center point

The invention claimed is:

1. An earphone device comprising:
a first sound emitting unit configured to be worn on one ear of a user; and
a second sound emitting unit configured to be worn on another ear of the user, wherein
the first sound emitting unit includes:
a first antenna;
a first driver unit configured to be driven based on a first audio signal received by the first antenna;
a first storage battery configured to supply power to the first antenna;
a first magnet to be used for attaching the first sound emitting unit to the second sound emitting unit; and
a power feeding control unit configured to control turn-on and turn-off of power feeding from the first storage battery to the first antenna,
the second sound emitting unit includes:
a second antenna;
a second driver unit configured to be driven based on a second audio signal received by the second antenna;
a second storage battery configured to supply power to the second antenna; and
a second magnet to be used for attaching the second sound emitting unit to the first sound emitting unit,
the first sound emitting unit is physically separable from the second sound emitting unit,
the first sound emitting unit is connected to the second sound emitting unit by magnetic forces of the first magnet and the second magnet, and
when the first storage battery is not being charged, the power feeding control unit is configured to
turn off the power feeding only in a case where the first sound emitting unit is connected to the second sound emitting unit, and
turn on the power feeding only in a case where the first sound emitting unit is not connected to the second sound emitting unit.

2. The earphone device according to claim 1, wherein
the first sound emitting unit includes a unit connection determination unit configured to determine whether the first sound emitting unit is connected to the second sound emitting unit, and
the power feeding control unit controls the power feeding, based on a determination result of the unit connection determination unit.

3. The earphone device according to claim 1, wherein the first storage battery is charged when the first sound emitting unit is connected to the second sound emitting unit.

4. The earphone device according to claim 1, wherein the power feeding control unit turns off the power feeding during charging the first storage battery.

5. The earphone device according to claim 1, wherein
the first storage battery is charged by a charger,
the charger includes a first earphone magnet,
the first sound emitting unit includes a first charger magnet,
the first sound emitting unit is connected to the charger by magnetic forces of the first earphone magnet and the first charger magnet, and
a first magnetic force between the first charger magnet and the first earphone magnet has a magnitude smaller than a magnitude of a magnetic force between the first magnet and the second magnet.

6. The earphone device according to claim 5, wherein
the charger includes a second earphone magnet,
the second sound emitting unit includes a second charger magnet,
the second sound emitting unit is connected to the charger by magnetic forces of the second earphone magnet and the second charger magnet, and
a sum of the magnitude of the first magnetic force and a magnitude of a second magnetic force between the second charger magnet and the second earphone magnet is smaller than the magnitude of the magnetic force between the first magnet and the second magnet.

7. The earphone device according to claim 5, wherein
the first sound emitting unit includes a charger connection determination unit configured to determine whether the first sound emitting unit is connected to the charger, and
the power feeding control unit controls the power feeding, based on a determination result of the charger connection determination unit.

8. The earphone device according to claim 1, wherein
the first sound emitting unit includes a first terminal configured to function as the first magnet,
the second sound emitting unit includes a second terminal configured to function as the second magnet, and
the first terminal is electrically connected to the second terminal when the first sound emitting unit is connected to the second sound emitting unit.

9. The earphone device according to claim 8, wherein
the first sound emitting unit includes a connection determination unit configured to determine whether the first terminal is electrically connected to the second terminal, and
the power feeding control unit controls the power feeding, based on a determination result of the connection determination unit.

10. The earphone device according to claim 8, wherein power stored in the first storage battery is fed to the second storage battery via the first terminal and the second terminal.

11. The earphone device according to claim 8, wherein the first storage battery receives power stored in the second storage battery via the first terminal and the second terminal.

12. The earphone device according to claim 1, wherein the first sound emitting unit has a shape that is in a mirror-image relationship with a shape of the second sound emitting unit, with a connecting surface serving as a plane of symmetry when the first sound emitting unit and the second sound emitting unit are interconnected.

13. The earphone device according to claim 11, wherein the first sound emitting unit has a shape that is point-symmetric to a shape of the second sound emitting unit, with a virtual center point as the center when the first sound emitting unit and the second sound emitting unit are interconnected.

14. The earphone device according to claim 8,
wherein
the first magnet includes
a first north pole terminal configured to function as north pole, and
a first south pole terminal configured to function as south pole,
the second magnet includes
a second north pole terminal configured to function as north pole,
and a second south pole terminal configured to function as south pole, and
the first sound emitting unit is connected to the second sound emitting unit by magnetic forces of the first north pole terminal and the second south pole terminal and by magnetic forces of the first south pole terminal and the second north pole terminal.

15. The earphone device according to claim 11, wherein power stored in the first storage battery is fed to the second storage battery when the first sound emitting unit is connected to the second sound emitting unit.

16. The earphone device according to claim 15, wherein the power stored in the first storage battery is fed to the second storage battery when an amount of the power stored in the first storage battery is larger than an amount of power stored in the second storage battery.

17. The earphone device according to claim 16, wherein
the first sound emitting unit includes a power comparator configured to compare the amount of power stored in the first storage battery with the amount of power stored in the second storage battery, and
the power feeding control unit controls the feeding of the power stored in the first storage battery to the second storage battery, based on a comparison result by the power comparator.

18. The earphone device according to claim 1, wherein the first storage battery receives the power stored in the second storage battery when the first sound emitting unit is connected to the second sound emitting unit.

19. The earphone device according to claim 1, wherein
the first storage battery and the second storage battery are charged by receiving power from the charger,
the first sound emitting unit includes a first housing configured to accommodate the first antenna, the first driver unit, the first storage battery, and the first magnet,
the second sound emitting unit includes a second housing configured to accommodate the second antenna, the second driver unit, the second storage battery, and the second magnet,
the charger includes a main body on which the first sound emitting unit and the second sound emitting unit are placed,
a portion of the first housing and a portion of the second housing protrude to an outside of the main body in a state in which the first sound emitting unit and the second sound emitting unit are placed on the main body,
the first magnet is accommodated in the portion of the first housing, and
the second magnet is accommodated in the portion of the second housing.

20. The earphone device according to claim 19, wherein the first housing includes a first grip portion, the second housing includes a second grip portion, and when the first sound emitting unit and the second sound emitting unit are placed on the main body, the first magnet and the second magnet are arranged between the first grip portion and the second grip portion.

21. The earphone device according to claim 20, wherein the first magnet is accommodated in an upper half of the portion of the first housing.

* * * * *